(12) United States Patent
Kobayashi et al.

(10) Patent No.: US 8,263,510 B2
(45) Date of Patent: Sep. 11, 2012

(54) OPTICAL GLASS, GLASS MOLDED BODY, OPTICAL DEVICE AND THEIR PRODUCTION METHODS

(75) Inventors: Yuta Kobayashi, Kawasaki (JP); Yoichi Hachitani, Tokyo (JP); Yunoshin Kanayama, Tokyo (JP)

(73) Assignee: Hoya Corporation, Tokyo (JP)

(*) Notice: Subject to any disclaimer, the term of this patent is extended or adjusted under 35 U.S.C. 154(b) by 227 days.

(21) Appl. No.: 12/304,834

(22) PCT Filed: Jun. 19, 2007

(86) PCT No.: PCT/JP2007/062658
§ 371 (c)(1),
(2), (4) Date: Feb. 24, 2009

(87) PCT Pub. No.: WO2007/148816
PCT Pub. Date: Dec. 27, 2007

(65) Prior Publication Data
US 2009/0176641 A1 Jul. 9, 2009

(30) Foreign Application Priority Data
Jun. 21, 2006 (JP) ................................ 2006-171569

(51) Int. Cl.
*C03C 3/155* (2006.01)
*C03C 3/068* (2006.01)
(52) U.S. Cl. ............... 501/51; 501/78; 501/50; 501/79
(58) Field of Classification Search .................... 501/50, 501/51, 78, 79
See application file for complete search history.

(56) References Cited

U.S. PATENT DOCUMENTS

| | | | |
|---|---|---|---|
| 4,439,531 A * | 3/1984 | Mennemann et al. | 501/75 |
| 4,472,511 A | 9/1984 | Mennemann et al. | |
| 6,912,093 B2 * | 6/2005 | Endo | 359/642 |
| 2003/0032542 A1 | 2/2003 | Endo | |
| 2003/0211929 A1 * | 11/2003 | Hayashi et al. | 501/78 |
| 2004/0235638 A1 * | 11/2004 | Uehara et al. | 501/78 |
| 2005/0049135 A1 * | 3/2005 | Hayashi | 501/78 |
| 2006/0189473 A1 * | 8/2006 | Endo | 501/78 |
| 2007/0049483 A1 * | 3/2007 | Hayashi | 501/78 |
| 2008/0220961 A1 * | 9/2008 | Uehara et al. | 501/78 |

FOREIGN PATENT DOCUMENTS

| | | |
|---|---|---|
| CN | 1618745 A | 5/2005 |
| CN | 1729147 A | 2/2006 |
| JP | 54-90218 | 7/1979 |
| JP | 56-160340 | 12/1981 |
| JP | 58-69739 | 4/1983 |
| JP | 2002-284542 | 10/2002 |
| JP | 2005-008975 | 1/2005 |
| JP | 2006-52109 | 2/2006 |

OTHER PUBLICATIONS

Derwent Abstract 2005-640511 and machine translation of JP 2006-052109 A, Feb. 23, 2006.*
International Search Report for PCT/JP2007/062658, mailed Oct. 2, 2007.
Written Opinion of the International Searching Authority, mailed Oct. 2, 2007.
First Office Action in Chinese patent application No. 2010121500580470 dated Dec. 20, 2010.

* cited by examiner

*Primary Examiner* — Karl Group
*Assistant Examiner* — Elizabeth A Bolden
(74) *Attorney, Agent, or Firm* — Nixon & Vanderhye P.C.

(57) ABSTRACT

An optical class comprising, by mass %, 12 to 30% of total of $B_2O_3$ and $SiO_2$, 55 to 80% of total of $La_2O_3$, $Gd_2O_3$, $Y_2O_3$, $ZrO_2$, $Nb_2O_5$ and $WO_3$, 2 to 10% of $ZrO_2$, 0 to 15% of $Nb_2O_5$, 0 to 15% of ZnO and 0% or more but less than 13% of $Ta_2O_5$, wherein the ratio of the content of $Ta_2O_5$ to the total content of $La_2O_3$, $Gd_2O_3$, $Y_2O_3$, $Yb_2O_3$, $ZrO_2$, $Nb_2O_5$ and $WO_3$ is 0.23 or less of the total content of $La_2O_3$, $Gd_2O_3$, $Y_2O_3$ and $Yb_2O_3$ to the total content of $B_2O_3$ and $SiO_2$ is from 2 to 4, the optical glass having a refractive index nd of 1.86 or more and an Abbe's number vd of 38 or more, and a rod shaped glass shaped material and an optical element formed of the above optical glass each.

9 Claims, 6 Drawing Sheets

OPTICAL GLASS, GLASS MOLDED BODY, OPTICAL DEVICE AND THEIR PRODUCTION METHODS

This application is the U.S. national phase of International Application No. PCT/JP2007/062658, filed 19 Jun. 2007, which designated the U.S. and claims priority to Japanese Application No. 2006-171569, filed 21 Jun. 2006, the entire contents of each of which are hereby incorporated by reference.

TECHNICAL FIELD

This invention relates to a high-refractivity low-dispersion optical glass having a refractive index nd of 1.86 or more and an Abbe's number vd of 38 or more, a glass shaped material formed of the above optical glass, an optical element formed of the above optical glass and their production methods.

BACKGROUND ART

In an image-sensing system of a camera lens, etc., it is a frequently employed technique to combine a lens formed of a high-dispersion glass and a lens formed of a low-dispersion glass in order to correct chromatic aberration. JP54-90218A discloses one example of the above low-dispersion glass.

Meanwhile, for correcting chromatic aberration by a compacter constitution, it is desirable to increase a difference between the Abbe's number of a high-dispersion glass and that of a low-dispersion glass and at the same time increase the refractive index of the low-dispersion glass while. When the refractive index is increased, there can be produced a lens that has a desired refractive index and that simultaneously has the curvature of its optical-function surface decreased.

For achieving the above object, there is desired an optical glass having a refractive index nd of 1.86 or more and an Abbe's number vd of 38 or more.

However, a glass that satisfies the above optical properties has a large content of rare earth metal components), and the content of components) for forming a glass network is relatively decreased, so that it has a problem that it is degraded in devitrification resistance and is easily devitrified when shaped by softening it under heat.

In the invention disclosed in the above laid-open Patent Publication, a large amount of $Ta_2O_5$ is incorporated for overcoming the above problem. Since, however, $Ta_2O_5$ is rare and expensive, a production cost is increased. As a result, the problem is that the use of the above glass is limited although it is a useful glass.

DISCLOSURE OF THE INVENTION

Under the circumstances, the object of this invention is to provide a high-refractivity low-dispersion optical glass excellent in devitrification resistance, and to provide a glass shaped material and optical element formed of the above optical glass and methods for the production of the above glass shaped material and optical element.

For achieving the above object, the present inventors have made diligent studies, and as a result, it has been found that the object can be achieved by an optical glass having a specific glass composition and having certain values of a refractive index and an Abbe's number or more, which finding has led to completion of this invention.

That is, this invention provides (1) an optical glass comprising, by mass %, 12 to 30% of total of $B_2O_3$ and $SiO_2$, 55 to 80% of total of $La_2O_3$, $Gd_2O_3$, $Y_2O_3$, $Yb_2O_3$, $ZrO_2$, $Nb_2O_5$ and $WO_3$, 2 to 10% of $ZrO_2$, 0 to 15% of $Nb_2O_5$, 0 to 15% of ZnO and 0% or more but less than 13% of $Ta_2O_5$, wherein the ratio of the content of $Ta_2O_5$ to the total content of $La_2O_3$, $Gd_2O_3$, $Y_2O_3$, $Yb_2O_3$, $ZrO_2$, $Nb_2O_5$ and $WO_3$ is 0.23 or less, the ratio of the total content of $La_2O_3$, $Gd_2O_3$, $Y_2O_3$ and $Yb_2O_3$ to the total content of $B_2O_3$ and $SiO_2$ is from 2 to 4, the optical glass having a refractive index nd of 1.86 or more and an Abbe's number vd of 38 or more, (2) an optical glass as recited in the above (1), which contains 1 to 15% of $Nb_2O_5$, (3) an optical glass as recited in the above (1) or (2), which contains 0 to 15% of $WO_3$, (4) an optical glass as recited in any one of the above (1) to (3), which contains 30 to 70% of total of $La_2O_3$, $Gd_2O_3$, $Y_2O_3$ and $Yb_2O_3$, (5) an optical glass as recited in any one of the above (1) to (4), which contains 5 to 25% of $B_2O_3$, 1 to 14% of $SiO_2$, 30 to 60% of $La_2O_3$, 0 to 30% of $Gd_2O_3$, 0 to 10% of $Y_2O_3$, 0 to 5% of $Yb_2O_3$, 0 to 20% of Bao, 0 to 12% of $TiO_2$ and 0 to 1%; of $Sb_2O_3$, (6) a rod-shaped glass shaped material formed of the optical glass recited in any one of the above (1) to (5) (to be referred to as "glass shaped material I" hereinafter), (7) a rod-shaped glass shaped material formed of an optical glass having a refractive index nd of 1.86 or more and an Abbe's number vd of 38 or more and having a crystallization peak temperature Tx and a glass transition temperature Tg, the difference (Tx−Tg) between the crystallization peak temperature and the glass transition temperature being 110° C. or more (to be referred to as "glass shaped material II" hereinafter), (8) a rod-shaped glass shaped material as recited in the above (7), wherein the optical glass has a $Ta_2O_5$ content of 0% or more but less than 13 mass %, (9) a rod-shaped glass shaped material as recited in the above (7) or (8), wherein the ratio of the content of $Ta_2O_5$ to the total content of $La_2O_3$, $Gd_2O_3$, $Y_2O_3$, $Yb_2O_3$, $ZrO_2$, $Nb_2O_5$ and $WO_3$ is 0.23 or less,

(10) a rod-shaped glass shaped material as recited in any one of the above (7) to (9), wherein the optical glass contains, by mass %, 0 to 15% of $Nb_2O_5$, 2 to 10% of $ZrO_2$ and 0 to 15% of ZnO,

(11) a rod-shaped glass shaped material as recited in any one of the above (7) to (10), which comprises, by mass %, 12 to 30% of total of $B_2O_3$ and $SiO_2$ and 55 to 80% of total of $La_2O_3$, $Gd_2O_3$, $Y_2O_3$, $Yb_2O_3$, $ZrO_2$, $Nb_2O_5$ and $WO_3$, the ratio of the total content of $La_2O_3$, $Gd_2O_3$, $Y_2O_3$ and $Yb_2O_3$ to the total content of $B_2O_3$ and $SiO_2$ being from 2 to 4,

(12) a rod-shaped glass shaped material as recited in any one of the above (6) to (11), which has a side surface formed by solidification of the glass in a molten state,

(13) a method for the production of a glass shaped material which comprises casting into a mold a molten glass obtained by heating and melting a glass raw material to shape it into a glass shaped material formed of an optical glass, wherein a mold having a through hole is used, the molten glass is caused to continuously flow into said through hole to shape it into the glass shaped material, the shaped glass is continuously withdrawn from the through hole, and the molten glass is cooled by brining the inner wall of the through hole into contact with the molten glass so that the inner wall surrounds the molten glass moving inside the through hole, to produce the glass shaped material formed of the optical glass recited in any one of the above (1) to (5) (to be referred to as "production method I" hereinafter),

(14) a method for the production of a glass shaped material, which comprises casting into a mold a molten glass obtained by heating and melting a glass raw material to shape it into a glass shaped material formed of an optical glass, wherein a mold having a through hole is used, the molten glass is caused to continuously flow into said through hole to shape it into the glass shaped material, the shaped glass is continuously withdrawn from the through hole, and the molten glass is cooled by brining the inner wall of the through hole into contact with the molten glass so that the sinner wall surrounds the molten glass moving inside the through hole, to produce the glass shaped material formed of an optical glass having a refractive index nd of 1.86 or more and an Abbe's number vd of 38 or more and having a crystallization temperature Tx and a glass transition temperature Tg, the difference (Tx−Tg) between the crystallization peak temperature and the glass transition temperature being 110° C. or more (to be referred to as "production method II" hereinafter),

(15) an optical element formed of the optical glass recited in any one of the above (1) to (5),

(16) a method for the production of an optical element, which comprises the step of softening a glass material formed of the optical glass recited in any one of the above (1) to (5) under heat and shaping it, and

(17) a method for the production of an optical element, which comprises the steps of preparing a glass material from a glass shaped material prepared by the method recited in the above (13) or (14), softening the glass material under heat and shaping it.

According to this invention, there can be provided a high-refractivity low-dispersion optical glass excellent in devitrification resistance, a glass material for shaping by heating and softening and an optical element both formed of the above optical glass, and methods for the production of the above glass material and optical element.

Further, the above effect can be attained without using a large amount of expensive $Ta_2O_5$.

BEST MODES OF THE INVENTION

Figure 1:
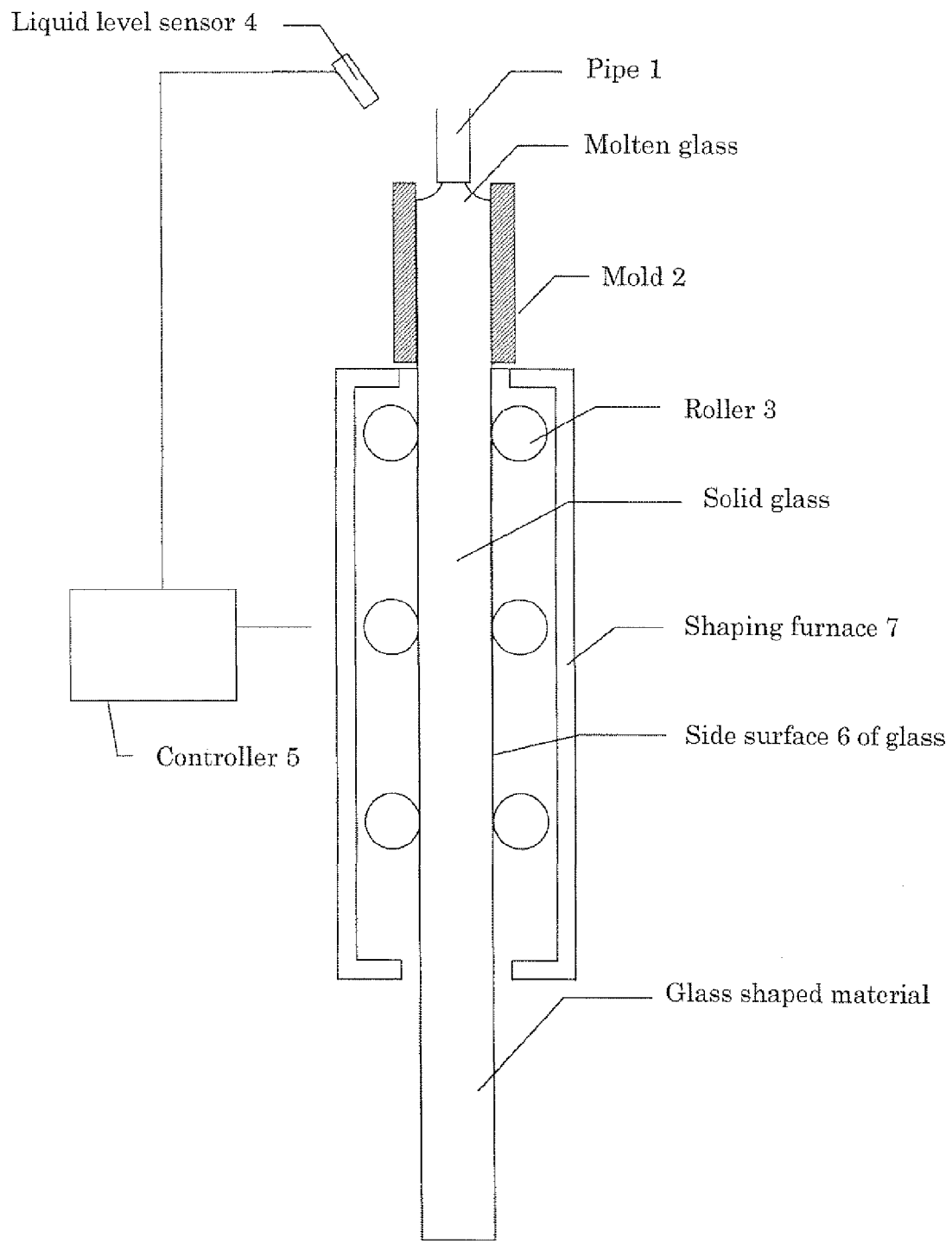
FIG. 1 is a drawing for explaining one example of the method for the production of a glass shaped material, provided by this invention.

First, the optical glass of this invention will be explained.
[Optical Glass]

The optical glass of this invention comprises, by mass %, 12 to 30% of total of $B_2O_3$ and $SiO_2$, 55 to 80% of total of $La_2O_3$, $Gd_2O_3$, $Y_2O_3$, $Yb_2O_3$, $ZrO_2$, $Nb_2O_5$ and $WO_3$, 2 to 10% of $ZrO_2$, 0 to 15% of $Nb_2O_5$, 0 to 15% of ZnO and 0% or more but less than 13% of $Ta_2O_5$, wherein the ratio of the content of $Ta_2O_5$ to the total content of $La_2O_3$, $Gd_2O_3$, $Y_2O_3$, $Yb_2O_3$, $ZrO_2$, $Nb_2O_5$ and WO3 is 0.23 or less, the ratio of the total content of $La_2O_3$, $Gd_2O_3$, $Y_2O_3$ and $Yb_2O_3$ to the total content of $B_2O_3$ and $SiO_2$ is from 2 to 4, the optical glass having a refractive index nd of 1.86 or more and an Abbe's number vd of 38 or more.

In this invention, a content of each component or a total content means mass %, and a ratio of contents or total contents means mass ratio, unless otherwise specified.

In the optical glass of this invention, both $B_2O_3$ and $SiO_2$ work as network-forming components. When the total content of $B_2O_3$ and $SiO_2$ ($B_2O_3+SiO_2$) is less than 12%, the devitrification resistance is decreased, and when it exceeds 30%, the refractive index is decreased. $B_2O_3+SiO_2$ is hence limited to 12 to 30%. The lower limit thereof is preferably 14%, more preferably 16%, still more preferably 17%. The upper limit thereof is preferably 28%, more preferably 26%, still more preferably 25%, yet more preferably 24%.

In an embodiment in which the total content of alkaline earth metal oxide and $TiO_2$ to be described later is less than 5%, further, the upper limit of $B_2O_3+SiO_2$ is preferably 23%, more preferably 22%, still more preferably 21%, particularly preferably 20%, most preferably 19%.

Each of $La_2O_3$, $Gd_2O_3$, $Y_2O_3$, $Yb_2O_3$, $ZrO_2$, $Nb_2O_5$ and $WO_3$ is a component that increases the refractive index, and for obtaining a predetermined refractive index while keeping the $Ta_2O_5$ content low, it is required to incorporate them so as to attain a total content of 55% or more. However, when it exceeds 80%, the devitrification resistance is decreased, so that it is limited to 55 to 80%. In an embodiment in which the total content of alkaline earth metal oxides and $TiO_2$ is 5% or less, the lower limit thereof is preferably 58% or less, more preferably 60%, still more preferably 62%. The upper limit thereof is preferably 76%, more preferably 74%, still more preferably 72%.

However, in an embodiment in which the total content of alkaline earth metal oxides and $TiO_2$ is over 5%, the lower limit of the total content of $La_2O_3$, $Gd_2O_3$, $Y_2O_3$, $Yb_2O_3$, $ZrO_2$, $Nb_2O_5$ and $WO_3$ is preferably 56%, more preferably 58%, still more preferably 60%. The upper limit thereof is preferably 76%, more preferably 74%, still more preferably 72%.

Of these, 2% or more of $ZrO_2$ is introduced since it can increase the glass stability when introduced in a small amount. However, when over 10% of $ZrO_2$ is introduced, the dispersion is increased, so that the content thereof is preferably limited to 2 to 10%. In an embodiment in which the total content of alkaline earth metal oxides and $TiO_2$ is 5% or less, the lower limit thereof is preferably 3%, more preferably 4%, still more preferably 5%, yet more preferably 5.2%, further more preferably 5.5%. The upper limit thereof is preferably 8.5%, more preferably 7.5%, still more preferably 6.8%.

$Nb_2O_5$ improves the devitrification resistance during the shaping by softening under heat (to be referred to as "devitrification resistance during reheating" when it is introduced in a proper amount. When over 15% of $Nb_2O_5$ is introduced, however, the devitrification resistance is decreased, and the dispersion is increased. The content thereof is hence limited to 0 to 15%.

In the glass of this invention, $Nb_2O_5$ has a specific property among the above components for imparting high refractivity, and it improves the devitrification resistance during reheating by its substitution for $Ta_2O_5$. As a criterion for the devitrification resistance during reheating, it can be considered that a glass having a larger difference (Tx−Tg) between a crystallization peak temperature Tx and a glass transition temperature Tg is more excellent in devitrification resistance. When the content of $Ta_2O_5$ is decreased while maintaining the property of high refractivity, the replacement of $Ta_2O_5$ with $Nb_2O_5$ is the most preferred for keeping a large difference (Tx−Tg). The substitution of MgO, CaO, SrO, BaO and ZnO for $Ta_2O_5$ has an effect on the maintenance of the devitrification resistance during reheating although the effect is not as high as that produced by the substitution of $Nb_2O_5$. On the other hand, in view of the maintenance of the devitrification resistance during reheating, it cannot be said that the substitution of rare earth oxides for $Ta_2O_5$ is preferred. For improving the devitrification resistance during reheating, therefore, it is preferred to adjust the content of $Nb_2O_5$ to the range of 1 to 15%. In an embodiment in which $Nb_2O_5$ is introduced as an essential component and in which the total content of alkaline earth metal oxides and $TiO_2$ is 5% or less, the content of $Nb_2O_5$ is preferably 1 to 8%, more preferably in the range of 2 to 8%, still more preferably in the range of 2.5 to 8%, yet more preferably in the range of 3 to 8%. The upper limit of the $Nb_2O_5$ content is preferably 7% or less, more preferably 6% or less, still more preferably 5% or less.

In an embodiment in which the total content of alkaline earth metal oxides and $TiO_2$ is over 5%, the upper limit of the $Nb_2O_5$ content is preferably 6%, more preferably 5%, still more preferably 4%.

ZnO is a component that maintains the property of high refractivity and at the same time decreases the glass transition temperature. However, when over 15% of ZnO is introduced, the devitrification resistance is decreased, and the dispersion is also increased. The content thereof is hence limited to 0 to 15%. The upper limit thereof is preferably 12%, more preferably 9%, still more preferably 7%, yet more preferably 6%. The lower limit thereof is preferably 0.1%, more preferably 0.5%, still more preferably 1%, yet more preferably 2%.

$Ta_2O_5$ is a component for imparting high refractivity, but its raw material cost is overwhelmingly high as compared with the above components for imparting high refractivity. Further, since it is a rare substance, its content is limited to less than 13%. Any conventional glass contains 15% or more of $Ta_2O_5$ for achieving optical properties equivalent to those of the glass of this invention. In this invention, however, the contents of other components are well balanced as will be described later, and $Ta_2O_5$ is hence replaced with other components for imparting high refractivity, whereby this invention brings about the realization of a decrease in the content of $Ta_2O_5$ with the maintenance of desired optical properties. From the above viewpoint, the content of $Ta_2O_5$ is preferably in the range of 0 to 12%, more preferably in the range of 0 to 11%, still more preferably 0 to 10%.

In addition, for further decreasing the $Ta_2O_5$ content with maintaining the various properties of the above glass, it is preferred to adjust the total content of alkaline earth metal oxides and $TiO_2$ to over 5%, and it is more preferred to adjust it to 6% or more. The above total content is still more preferably in the range of 6 to 10%. In an embodiment in which the total content of alkaline earth metal oxides and $TiO_2$ is larger the devitrification resistance during reheating is improved by replacing $Ta_2O_5$ with at least one of alkaline earth metal oxides and $TiO_2$. Further, the devitrification resistance during reheating can be further improved by replacing $Ta_2O_5$ with $Nb_2O_5$ and introducing 1% or more of $Nb_2O_5$. In this embodiment, the content of $Ta_2O_5$ is preferably in the range of 0 to 11%, more preferably in the range of 0 to 10%.

For maintaining a desired refractive index while keeping the $Ta_2O_5$ in the above range, the ratio of the content of $Ta_2O_5$ to the total content of $La_2O_3$, $Gd_2O_3$, $Y_2O_3$, $Yb_2O_3$, $ZrO_2$, $Nb_2O_5$ and $WO_3$ ($Ta_2O_5/(La_2O_3+Gd_2O_3+Y_2O_3+Yb_2O_3+ZrO_2+Nb_2O_5+WO_3)$) is adjusted to 0.23 or less. The above ratio is preferably in the range of 0.22 or less, more preferably in the range of 0.21 or Less, still more preferably in the range of 0.2 or less, yet more preferably in the range of 0.17 or less, further more preferably in the range of 0.16 or less.

The optical glass of this invention is a glass having a refractive index nd of 1.86 or more and an Abbe's number vd of 38 or more. For keeping the devitrification resistance excellent while maintaining the above optical properties, the ratio of the total content of $La_2O_3$, $Gd_2O_3$, $Y_2O_3$ and $Yb_2O_3$ to the total content of $B_2O_3$ and $SiO_2$ as components for forming a network $((La_2O_3+Gd_2O_3+Y_2O_3+Yb_2O_3)/(B_2O_3+SiO_2))$ is adjusted to the range of 2 to 4. Of the components for imparting high refractivity, $La_2O_3$, $Gd_2O_3$, $Y_2O_3$ and $Yb_2O_3$ work to increase the refractive index while keeping the dispersion low. When the above ratio is smaller than 2, therefore, it is difficult to maintain the above optical properties. When it is larger than 4, the devitrification resistance is decreased. In an embodiment in which the total content of alkaline earth metal oxides and $TiO_2$ is 5% or less, the lower limit of the above ratio is preferably 2.4, more preferably 2.6, still more preferably 2.8. The upper limit of the above ratio is preferably 3.8, more preferably 3.6, still more preferably 3.5. In an embodiment in which the total content of alkaline earth metal oxides and $TiO_2$ is over 5%, the lower limit of the above ratio is preferably 2.5, more preferably 2.7, still more preferably 2.9. The upper Limit of the above ratio is preferably 3.9, more preferably 3.7, still more preferably 3.6.

$WO_3$ is a component for imparting high refractivity, and yet the devitrification resistance is decreased when it is introduced to excess. Therefore, the content of $WO_3$ is preferably 15% or less, more preferably 10% or less. In an embodiment using $Nb_2O_5$ as an optional component, there cannot be obtained the effect that the devitrification resistance during reheating is improved by the introduction of $Nb_2O_5$, so that it is preferred to adjust the $WO_3$ content to 0 to 6%. Further, when $WO_3$ is introduced, the glass tends to be colored. Regardless of whether or not $Nb_2O_5$ is introduced, therefore, the content thereof is more preferably 0 to 4%, still more preferably 0 to 2%, yet more preferably 0 to 1%, further more preferably 0 to 0.5%, and it is particularly preferred to incorporate no $WO_3$.

For imparting the above optical properties and for more improving the stability of the glass, it is preferred to adjust the total content of $La_2O_3$, $Gd_2O_3$, $Y_2O_3$ and $Yb_2O_3$ to 30 to 70%. In an embodiment in which the total content of alkaline earth metal oxides and $TiO_2$ is 5% or less, the lower limit of the above total content is preferably 45%, more preferably 46%, still more preferably 47%, yet more preferably 48%, further more preferably 49%, still further more preferably 50%. The upper limit of the above total content is preferably 70%, more preferably 69%, still more preferably 68%, yet more preferably 67%, further more preferably 66%, further more preferably 65%, still further more preferably 64%

In an embodiment in which the total content of alkaline earth metal oxides and $TiO_2$ is over 5%, the lower limit of the total content of $La_2O_3$, $Gd_2O_3$, $Y_2O_3$ and $Yb_2O_3$ is preferably 47%, more preferably 48%, still more preferably 49%, yet more preferably 50%, further more preferably 51%, still further more preferably 52%. The upper limit of the above total content is preferably 70%, more preferably 69%, still more preferably 68%, yet more preferably 67%, further more preferably 66%, still further more preferably 65%, yet further more preferably 64%.

Of the components for forming a network, $B_2O_3$ works to improve the meltability and decrease the glass transition temperature. For attaining these effects, it is preferred to incorporate 5% or more of $B_2O_3$ and for further increasing the refractivity, it is preferred to keep the content thereof 25% or less. Therefore, the content of $B_2O_3$ is preferably in the range of 5 to 25%. In an embodiment in which the total content of alkaline earth metal oxides and $TiO_2$ is 5% or less, the content of $B_2O_3$ is preferably in the range of 5 to 20%. The lower limit of the $B_2O_3$ content is preferably 7%, more preferably 8%, still more preferably 9%. The upper limit thereof is preferably 19%, more preferably 18%, still more preferably 17%.

In an embodiment in which the total content of alkaline earth metal oxides and $TiO_2$ is over 5%, the content of $B_2O_3$ is preferably in the range of 8 to 25%. The lower limit of the $B_2O_3$ content is preferably 10%, more preferably 11%, still more preferably 12%. The upper limit thereof is preferably 24%, more preferably 23%, still more preferably 22%.

$SiO_2$ works to improve the devitrification resistance and increase the viscosity during the formation of a molten glass. For attaining these effects, it is preferred to incorporate 1% or more of $SiO_2$, and for further increasing the refractivity, it is preferred to keep the content thereof 14% or less. Therefore, the content of $SiO_2$ is preferably in the range of 1 to 14%. In an embodiment in which the total content of alkaline earth metal oxides and $TiO_2$ is 5% or less, the $SiO_2$ content is preferably in the range of 2 to 14%. The lower limit of the $SiO_2$ content is preferably 4%, more preferably 5%, still more preferably 6%. The upper limit of the content thereof is preferably 12%, more preferably 10%, still more preferably 8%. In an embodiment in which the total content of alkaline earth metal oxides and $TiO_2$ is over 5%, the $SiO_2$ content is preferably in the range of 1 to 10%. The lower limit of the $SiO_2$ content is preferably 1.5%, more preferably 2%, still more preferably 2.5%. The upper limit thereof is preferably 9%, more preferably 8%, still more preferably 7%.

$La_2O_3$ is a component that imparts high-refractivity low-dispersion properties as described already. However, when it is introduced to excess, the devitrification resistance may be decreased, so that the content thereof is preferably limited to 30 to 60%. The lower limit thereof is preferably 35%, more preferably 38%. The upper limit thereof is preferably 55%, more preferably 50%, still more preferably 47%. In an embodiment in which the total content of alkaline earth metal oxides and $TiO_2$ is 5% or less, the lower limit of the $La_2O_3$ content is still more preferably 40%. In an embodiment in which the total content of alkaline earth metal oxides and $TiO_2$ is over 5%, the upper limit of the $La_2O_3$ content is yet more preferably 45%.

$Gd_2O_3$ is also a component that imparts high-refractivity low-dispersion properties. When it is introduced to excess, however, the devitrification resistance may be decreased, so that it is preferred to limit its content to 0 to 30%. The lower limit thereof is preferably 1%, more preferably 3%, still more preferably 5% The upper limit thereof is preferably 25%, more preferably 22%, still more preferably 20%, yet more preferably 19%.

$Y_2O_3$ is also a component that imparts high-refractivity low-dispersion properties. When it is introduced to excess, the devitrification resistance may be decreased, so that it is preferred to limit its content to 0 to 10%. The lower limit thereof is preferably 1%. The upper limit thereof is preferably 8%, more preferably 6%, still more preferably 5%.

$Yb_2O_3$ is also a component that imparts high-refractivity low-dispersion properties. When it is introduced to excess, the devitrification resistance may be decreased, so that it is preferred to limit its content to 0 to 5%. The upper limit thereof is preferably 3%, more preferably 2%, still more preferably 1%.

$Sb_2O_3$ works as a refining agent when added in a proper amount. The amount of $Sb_2O_3$ based on the glass composition excluding the amount thereof is preferably 0 to 1%, more preferably 0 to 0.5%, still more preferably 0 to 0.3%, yet more preferably 0 to 0.2%.

Examples of other optional components that can be introduced include MgO, CaO, SrO, BaO, $GeO_2$, $Li_2O$, $Na_2O$, $K_2O$, $Bi_2O_3$ and $TiO_2$.

MgO, CaO, SrO and BaO work to improve the meltability, and since they can be introduced as carbonate materials or nitrate materials, they also work to improve the effect of defoaming. Further, they are also components that can relatively easily maintain the devitrification resistance during reheating by their substitution for $Ta_2O_5$. When they are introduced to excess, however, the refractive index may be decreased, or the glass stability may be impaired. Therefore, it is preferred to limit the total content of MgO, CaO, SrO and BaO to 0 to 20%, and this total content is more preferably 0 to 10%, still more preferably 0 to 7%, yet more preferably 0 to 5%.

With regard to MgO, CaO, SrO and BaO, the substitution of MgO, CaO, SrO and BaO for $Ta_2O_5$ serves to maintain the optical properties in desired ranges more easily than the substitution of $B_2O_3$ and $SiO_2$. For attaining the above effect, therefore, MgO, CaO, SrO and BaO can be introduced such that the total content thereof is 0.5% or more so long as it is within the above range.

From the above viewpoint, the content of MgO is preferably in the range of 0 to 8%, more preferably 0 to 4%, still more preferably 0 to 2%, yet more preferably 0 to 1%.

The content of CaO is preferably in the range of 0 to 10%, more preferably 0 to 5%, still more preferably 0 to 3%, yet more preferably 0 to 1%.

The content of SrO is preferably in the range of 0 to 15%, more preferably 0 to 8%, still more preferably 0 to 5%, yet more preferably 0 to 2%.

The content of BaO is preferably in the range of 0 to 20%, more preferably 0 to 10%.

In an embodiment in which the total content of alkaline earth metal oxides and $TiO_2$ is 5% or less, the content of BaO is still more preferably in the range of 0 to 5%, yet more preferably 0 to 3%. In an embodiment in which the total content of alkaline earth metal oxides and $TiO_2$ is over 5%, the content of BaO is still more preferably in the range of 0 to 10%, yet more preferably 1 to 8%. Of the alkaline earth metal oxides that are suitable as components for constituting the optical glass, BaO intensely works to increase the refractive index, and it is hence preferred to introduce it positively.

$GeO_2$ is an optional component that works to form a network and works to a great extent to increase the refractive index as compared with $SiO_2$ and $B_2O_3$. When it is introduced to excess, however, the refractive index is decreased, and it is also a very expensive component and increases a production cost. Therefore, the content thereof is preferably 0 to 15%, more preferably to 0 to 5%, and it is still more preferred to introduce no $GeO_2$.

When introduced in a small amount, $Li_2O$, $Na_2O$ and $K_2O$ improve the meltability and decrease the glass transition temperature and the softening temperature, and the annealing temperature and the shaping temperature can be decreased. However, when they are introduced to excess, the refractive index is decreased and the devitrification resistance is degraded, so that the content of $Li_2O$ is preferably limited to 0 to 1%, more preferably, to 0 to 0.6%, stalls more preferably, to 0 to 0.4%, yet more preferably, to 0 to 0.2%. The content of $Na_2O$ is preferably limited to 0 to 2%, more preferably, to 0 to 1.2%, still more preferably, to 0 to 0.8%, yet more preferably, to 0 to 0.4%. The content of $K_2O$ is preferably limited to 0 to 3%, more preferably, to 0 to 2%, still more preferably, to 0 to 1.5%, yet more preferably, to 0 to 1%.

When introduced in a small amount, $Bi_2O_3$ works to decrease the glass transition temperature and the softening temperature and increase the refractive index. However, when it is introduced to excess, the coloring of the glass is intensified and the devitrification resistance is decreased. Therefore, the content thereof is preferably limited to 0 to 6%, more preferably, to 0 to 4%, still more preferably, to 0 to 3%, yet more preferably, to 0 to 2%.

When introduced in a proper amount, $TiO_2$ increases the refractive index. When it is introduced to excess, however, the dispersion is increased, the glass is colored and the devitrification resistance is decreased. Therefore, the content thereof is limited to 0 to 12%, preferably, to 0 to 10%, more preferably 0 to 8%, still more preferably 0 to 7%. It is thought that $TiO_2$ has high single bond strength, displaces some of network-forming components to participate in the formation of a network and also plays the role of a modifying oxide. And, it is thought that since $TiO_2$ participates in the formation of a network, the glass is stabilized. Since, however, the coloring of the glass may be intensified by the introduction of $TiO_2$, whether or not $TiO_2$ is introduced can be decided taking account of which specification is a priority, coloring, stability, etc. When $TiO_2$ is introduced, the content thereof is adjusted to 0.1% or more, preferably, to 0.5% or more, still more preferably, to 1% or more, yet more preferably, to 1.5% or more, further more preferably, to 2% or more, within the above range. When priority is given to the decreasing of the coloring, it is preferred to introduce no $TiO_2$.

In an embodiment in which the total content of alkaline earth metal oxides and $TiO_2$ is 5% or less, the $TiO_2$ content is preferably limited to 0 to 5%, more preferably, to 0 to 3%, still more preferably, to 0 to 2%, yet more preferably 0 to 1%.

In an embodiment in which the total content of alkaline earth metal oxides and $TiO_2$ is over 5%, the $TiO_2$ content is preferably limited to 1 to 12%, more preferably, to 2 to 10%, still more preferably, to 2.5 to 9%, yet more preferably, to 3 to 8%.

For improving the above properties more, both in an embodiment in which the total content of alkaline earth metal oxides and $TiO_2$ is 5% or less and in an embodiment in which the above total content is over 5%, the total content of $B_2O_3$, $SiO_2$, $La_2O_3$, $Gd_2O_3$, $Y_2O_3$, $Yb_2O_3$, $ZrO_2$, $Nb_2O_5$, $WO_3$, $Ta_2O_5$, MgO, CaO, SrO, BaO, $Li_2O$, $Na_2O$, $K_2O$ and $TiO_2$ is preferably adjusted to 95% or more, more preferably, to 96% or more, still more preferably, 98% or more, yet more preferably, 99% or more, further more preferably, to 100%.

Further, the total content of $B_2O_3$, $SiO_2$, $La_2O_3$, $Gd_2O_3$, $Y_2O_3$, $Yb_2O_3$, $ZrO_2$, $Nb_2O_5$, $WO_3$, $Ta_2O_5$, MgO, CaO, SrO, BaO and $TiO_2$ is preferably adjusted to 95% or more, more preferably, to 96% or more, still more preferably, to 98% or more, yet more preferably, to 99% or more, further more preferably, to 100%.

In an embodiment in which the total content of alkaline earth metal oxides and $TiO_2$ is 5% or less, the total content of $B_2O_3$, $SiO_2$, $La_2O_3$, $Gd_2O_3$, $Y_2O_3$, $ZrO_2$, $Nb_2O_5$, $Ta_2O_5$, MgO, CaO, SrO and BaO is preferably adjusted to 95% or more, more preferably, to 96% or more, still more preferably, to 98% or more, yet more preferably, to 99% or more, further more preferably, to 100%. In particular, the total content of $B_2O_3$, $SiO_2$, $La_2O_3$, $Gd_2O_3$, $Y_2O_3$, $ZrO_2$, $Nb_2O_5$ and $Ta_2O_5$ is preferably adjusted to 95% or more, more preferably, to 96% or more, still more preferably, to 98% or more, yet more preferably, to 99% or more, further more preferably, to 100%.

In an embodiment in which the total content of alkaline earth metal oxides and $TiO_2$ is over 5%, the total content of $B_2O_3$, $SiO_2$, $La_2O_3$, $Gd_2O_3$, $Y_2O_3$, $ZrO_2$, $Nb_2O_5$, $Ta_2O_5$, MgO, CaO, SrO, BaO and $TiO_2$ is preferably adjusted to 95% or more, more preferably, to 96% or more, still more preferably, to 98% or more, yet more preferably, to 99% or more, further more preferably, to 100%. In particular, the total content of $B_2O_3$, $SiO_2$, $La_2O_3$, $Gd_2O_3$, $Y_2O_3$, $ZrO_2$, $Nb_2O_5$, $Ta_2O_5$, MgO, CaO, SrO, BaO and $TiO_2$ is preferably adjusted to 95% or more, more preferably, to 96% or more, still more preferably, to 98% or more, yet more preferably, to 99% or more, further more preferably, to 100%.

In any one of the above preferred embodiments, $Sb_2O_3$ may be added in an amount within the already described range based on each glass composition excluding the amount thereof.

It is preferred to introduce none of Pb, As, Cd, Cr, Th and U due to their toxicity and radioactivity.

Further, Hf, Lu, Sc, Ga and In can be introduced. However, the glass of this invention can achieve the object of this invention without any one of these components. And, since the above components are all expensive, it is preferred to introduce none of Hf, Lu, Sc, Ga and In in view of a cost.

In addition, 1.0% or less of $SnO_2$ can be introduced for improving a refining activity. Since, however, the introduction of $SnO_2$ is not essential, $SnO_2$ may not be introduced.

F can be also introduced in a small amount. Since, however, it exhibits volatility and may cause striae and a variation in optical constants, it is preferred to introduce no F.

The optical glass of this invention is made by rapidly cooling a molten glass obtained by melting a glass raw material under heat, refining and homogenizing. As a glass raw material, there may be used a prepared raw material obtained by weighing and fully stirring oxides, borates, carbonates, nitrates, etc., corresponding to glass components as required. The molten glass may be made by roughly-melting the thus-prepared raw material to make a cullet raw material, mixing such cullet materials so as to obtain desired optical properties and carrying out melting, refining and homogenizing. Alternatively, the molten glass may be made, directly without rough-melting, by introducing a non-vitrified raw material such as a raw material powder or raw material pellets into a melting vessel and carrying out heating, melting, refining and homogenizing.

The optical glass of this invention is excellent in the devitrification resistance during reheating. Since, however, it is a glass having a relatively small content of components for forming a network due to high-refractivity low-dispersion properties which it is imparted with, it has a high liquidus temperature as compared with a glass whose refractive index is not high, and it is devitrified if the temperature during the formation of a molten glass is not high. As a result, the viscosity of the molten glass during shaping is decreased, and striae are liable to take place in a glass shaped material. For overcoming the above problem, desirably, the flow of the molten glass during the shaping is made as straight as possible to ensure that the outside flow and the inside flow of the molten glass are not mixed with each other. Further, for preventing the devitrification during the formation of the molten glass, desirably, the surface area of the molten glass is made as large as possible, and the glass is rapidly cooled by bringing a mold to contact with it and readily taking heat off the glass. For satisfying these conditions, it is desirable to shape a rod-shaped glass shaped material.

In the optical glass of this invention, the glass transition temperature Tg can be adjusted to 730° C. or lower, and the crystallization peak temperature Tx to be described later can be adjusted to 810° C. or higher. In one and the same glass, however, Tx−Tg can be broadened by 100° C. or more, the devitrification resistance during reheating can be more improved.

The range of the glass transition temperature Tg is preferably 720° C. or lower, more preferably 710° C. or lower, and the range of the crystallization peak temperature is preferably 815° C. or higher, more preferably 820° C. or higher, still more preferably 825° C. or higher, yet more preferably 830° C. or higher.

The range of Tx−Tg is preferably 120° C. or more, more preferably 125° C. or more, still more preferably 130° C. or more, yet more preferably 135° C. or more, further more preferably 140° C. or more, still further preferably 145° C. or more, yet further preferably 150° C. or more.

The glass shaped material of this invention will be explained below.

[Glass Shaped Material]

The glass shaped material of this invention includes two embodiments, a glass shaped material I and a glass shaped material II. The glass shaped material I is a rod-shaped glass shaped material formed of the above optical glass of this invention. According to the glass shaped material of this invention, the above effect can be obtained, and it is not required to unnaturally decrease the viscosity at a liquidus temperature for preventing striae and devitrification, so that the setting of a composition of a glass that lays stress on more improvement in the devitrification resistance during reheating can be implemented.

The glass shaped material II is that which attaches importance to this point, and it is a rod-shaped glass shaped material formed of an optical glass having a refractive index nd of 1.86 or more and an Abbe's number vd of 38 or more, in which the difference (Tx−Tg) between the crystallization peak temperature Tx and the glass transition temperature Tg is 110° C. or more, preferably 120° C. or more, more preferably 125° C. or more, still more preferably 130° C. or more, yet more preferably 135° C. or more, further more preferably 140° C. or more, still further more preferably 145° C. or more, yet further more preferably 150° C. or more. This glass shaped material I-E can produce effects similar to those produced by the above glass shaped material I.

The above crystallization peak temperature is determined as follows. In a differential scanning calorimetry, when a glass sample is temperature-increased, an endorthermic peak appears, and when the sample is further temperature-increased, an exothermic peak appears. A point at which this exothermic peak starts to appear is a crystallization peak temperature Tx.

In the differential scanning calorimetry, a differential scanning calorimetry curve (DSC curve) is obtained, in which the abscissa axis indicates temperatures and the ordinate axis indicates amounts corresponding to heat generation and absorption of a sample. In this curve, a point of intersection of a tangential line at a point where a gradient from a base line becomes a maximum when the exothermic peak appears and the above base line is used as a crystallization peak temperature Tx.

The crystallization peak temperature Tx can be measured by fully pulverizing a glass in a mortar to prepare a sample and measuring the sample, for example, with a high-temperature differential scanning calorimeter "Thermo Plus 2/DSC8270" supplied by Rigaku Corporation.

The glass transition temperature Tg can be measured by preparing a columnar glass sample having a diameter of 5 mm and a length of 20 mm and measuring it, for example, with a thermomechanical analysis apparatus "TMA4000s" supplied by BRUKER axs.

When a glass material is softened under heat and shaped into a desired form, it is required to heat the glass material to a temperature higher than its glass transition temperature. When the temperature of the glass during the above shaping reaches a temperature range in which the glass undergoes crystallization, the devitrification of the glass takes place, so that a glass having a small Tx−Tg is disadvantageous for carrying out shaping with preventing the devitrification. In this invention, therefore, Tx−Tg is adjusted to the above range. In a high-refractivity low-dispersion glass, when a composition is set such that Tx−Tg is large, the freedom for setting a composition for increasing a viscosity at a liquidus temperature is limited. In a glass having a low viscosity at a liquidus temperature, Tx−Tg can be increased to be a desired value or more by forming a glass shaped material that is optically homogeneous and that has a form having a large surface area.

As an optical glass for constituting the glass shaped material II of this invention, for the reason described in the explanation of the above optical glass of this invention, an optical glass having a $Ta_2O_5$ content of 0% or more but less than 13 mass % is preferred, and an optical glass in which the ratio of $Ta_2O_5$ to the total content of $La_2O_3$, $Gd_2O_3$, $Y_2O_3$, $Yb_2O_3$, $ZrO_2$, $Nb_2O_5$ and $WO_3$ is 0.23 or less is preferred. Further, an optical glass containing 0 to 15% of $Nb_2O_5$, 2 to 10% of $ZrO_2$ and 0 to 9% of ZnO, or an optical glass containing 12 to 30% of a total of $B_2O_3$ and $SiO_2$ and containing 55 to 80% of a total of $La_2O_3$, $Gd_2O_3$, $Y_2O_3$, $Yb_2O_3$, $ZrO_2$, $Nb_2O_5$ and $WO_3$, in which the ratio of the total content of $La_2O_3$, $Gd_2O_3$, $Y_2O_3$ and $Yb_2O_3$ to the total content of $B_2O_3$ and $SiO_2$ is from 2 to 4, are preferred.

In any embodiment of the glass shaped material of this invention, preferably, a side surface is a surface formed by the solidification of a glass in a molten state for obtaining the above effect.

The method for the production of a glass shaped material, provided by this invention, will be explained below.

[Method for the Production of Glass Shaped Material]

The method for the production of a glass shaped material, provided by this invention, includes two embodiments, a production method I and a production method II.

The production method I of a glass shaped material is a method for the production of a glass shaped material, which comprises casting into a mold a molten glass obtained by heating and melting a glass raw material into a mold to shape it into a glass shaped material formed of an optical glass, wherein a mold having a through hole is used, the molten glass is caused to continuously flow into said through hole to shape it into the glass shaped material, the shaped glass is continuously withdrawn from the through hole, and the molten glass is cooled by brining the inner wall of the through hole into contact with the molten glass so that the inner wall surrounds the molten glass moving inside the through hole, to produce the glass shaped material formed of the above optical glass of this invention.

The production method II of a glass shaped material is a method for the production of a glass shaped material, which comprises casting into a mold a molten glass obtained by heating and melting a glass raw material to shape it into a glass shaped material formed of an optical glass, wherein a mold having a through hole is used, the molten glass is caused to continuously flow into said through hole to shape it into the glass shaped material, the shaped glass is continuously withdrawn from the through hole, and the molten glass is cooled by brining the inner wall of the through hole into contact with the molten glass so that the inner wall surrounds the molten glass moving inside the through hole, to produce the glass shaped material formed of an optical glass having a refractive index nd of 1.86 or more and an Abbe's number vd of 38 or more and having a crystallization temperature Tx and a glass transition temperature Tg, the difference (Tx−Tg) between the crystallization peak temperature and the glass transition temperature being 110° C. or more. This production method II corresponds to a method for the production of the above glass shaped material II of this invention.

Preferred embodiments of the method for the production of a glass shaped material will be explained below.

In the above embodiment, a mold having a through hole is used, and a molten glass flowing out of a pipe is caused to continuously flow into the inlet of the above through hole and continuously withdrawn from the outlet of the above through hole to shape it into a solid glass. In at least one region (cooling region) of the above through hole, the side surface of the glass inside the above through hole is brought into contact with the inner wall of the above through hole to take heat of the above glass away through the above side surface and bring the temperature of central portion of the above glass and the temperature of the side surface close to each other.

In the above method, a mold having a through hole is used, and a molten glass flowing out of a pipe is caused to continuously flow into the inlet of the above through hole and continuously withdrawn from the outlet of the above through hole to shape it into a solid glass.

For shaping an optically homogeneous glass shamed material, it is essential to keep the flow of the molten glass from being disturbed even in the mold. For shaping a hollow glass, the mold is internally provided with a mechanism for partially blocking the flow of the glass so that no molten glass flows into a hollow portion, that is, a portion that is to be filled with no glass. For example, when it is intended to make hollow the central axis portion of a rod-shaped glass shaped material, a rod having high heat resistance like the mold is arranged along the central axis of the mold, and the molten glass is caused to flow in as it surrounds the above rod. In this case, the mechanism for blocking the filling of glass in the hollow portion corresponding to the above rod disturbs the flow of the molten glass. When it is intended to obtain an optically homogeneous glass shaped material, therefore, the glass shaped material is to be a solid glass shaped material free of the hollow portion.

The mold that is used has a through hole, and the through hole has an inlet for causing a molten glass to flow therein and an outlet for withdrawing a solid glass therefrom. A molten glass flowing out of a molten glass flow pipe is caused to continuously flow in the through hole. And, in at least one region (cooling region) inside the above through hole, the side surface of a glass from a molten state till at least the solidification-on of a surface, that is, the surface that faces in the direction perpendicular to the moving direction of the glass as a whole is brought into contact with the inner wall of the above through hole, whereby heat of the glass is taken away through the side surface. In this manner, there can be decreased or prevented the occurrence of striae in a glass that easily causes striae or in particular a glass that has a low viscosity when it is caused to flow out. In particular, when the entire circumferential side surface is brought into contact with the inner wall of the through hole in a manner that no gap is formed between the side surface and the inner wall of the through hole, the glass can be efficiently cooled.

As will be described later, for preventing the devitrification of the glass, preferably, the temperature of a molten glass that is caused to flow out of the pipe to flow into the inlet of the through hole is adjusted to a temperature around a liquidus temperature or higher. Specifically, the surface temperature of the molten glass that is caused to flow into the inlet of the through hole is preferably adjusted to the range of (liquidus temperature +10° C.) to (liquidus temperature +100° C.). The surface temperature of a molten glass flow that is caused to flow into the inlet of the through hole can be regarded as the same as the temperature of lower end of the flow pipe, and the temperature of the lower end of the flow pipe is measurable with a thermocouple. Further, the temperature of central portion of a molten glass that is caused to flow into the inlet of the through hole is measurable by inserting a thermocouple into the molten glass. The temperature difference between the surface temperature and the central portion temperature of a molten glass flow, which are measured as described above, is preferably adjusted to 120° C. or less, more preferably, to 60° C. or less, still more preferably 50° C. or less.

Preferably, the temperature of the mold (inner wall of the through hole) is determined by taking it into account that (1) glass does not adhere by fusing and that (2) molten glass spreads inside the through hole leaving no space. The mold may be provided with a heater, a condenser, or the like as required for temperature control. When the surface temperature of the glass shaped material in the outlet of the through hole is too high, it can be adjusted by cooling the mold with air or cooling the mold with a water-cooled plate, etc. When it is non low, it can be adjusted by heating with a heater.

As a temperature of inner wall of upper portion of the through hole in the above cooling region, there can be employed a temperature that is 50 to 150° C. lower than the glass transition temperature of the glass to be shaped. When the entire flow passage of glass inside the through hole is used as a cooling region as will be described later, a temperature that is 20 to 50° C. lower than the glass transition temperature of the glass to be shaped can be employed in the vicinity of the inlet as a temperature of the inner wall of the through hole, and when a shaping furnace is used, a temperature that is 100 to 400° C. lower than the glass transition temperature can be employed in the vicinity of the outlet, and a temperature that is the temperature in the vicinity of the inlet or lower and that is the temperature in the vicinity of the outlet or higher can be employed in an intermediate portion between the inlet and the outlet. The temperature of the inner wall of the through hole is measurable by making a hole in the mold and inserting a thermocouple close to the inner wall of the through hole.

When heat is taken away in the cooling region by bringing the side surface or the glass into contact with the inner wall of the through hole, the cooling of the glass can be promoted and the occurrence of striae can be prevented or decreased. As explained above, in a glass in particular having a low viscosity when it is caused to flow out, however, if there is an excess temperature difference between the inside and the surface of the glass that has been taken out of the mold, the glass may be destroyed or broken by an internal stress. Therefore, the glass that has passed the above cooling region is desirably caused to pass through an environment at a temperature lower than the glass transition temperature of the above glass by 150° C. (Tg −150° C.) or higher to bring the temperatures of the central portion and side surface of the above glass close to each other. In this manner, there can be prevented the destruction or breaking of the glass that has been rapidly cooled in the cooling region for decreasing and preventing striae, by an internal stress after it passes through the cooling region.

The above cooling region can be the entire glass flow passage inside the through hole. In this case, the environment at the above (Tg −150° C.) or higher can be an environment to which the glass withdrawn from the outlet of the through hole is exposed. When the temperatures of the central portions and side surface of the glass are brought close to each other by passing the glass withdrawn from the outlet of the through hole through an atmosphere at (Tg −150° C.) or higher as described above, preferably, the glass withdrawn from the outlet of the through hole is immediately placed in the above atmosphere.

Further, there can be employed a constitution in which the inside of the through hole is largely separated into two regions, an inlet side and an outlet side, the operation of brining the glass side surface into contact with the inner wall of the through hole to take away heat of the glass from the side surface is carried out in the region on the inlet side, and the temperature of inner wall of the through hole in the region on the outlet side is controlled to a temperature lower than the glass transition temperature Tg by 150° C. (Tg −150° C.) or higher. In this case, the above environment at (Tg −150° C.) or higher refers to the region on the outlet side where the above temperature control is applied. In this case, the region on the inlet side and the region on the outlet side may be thermally insulated to facilitate the temperature control in each region.

In any case above, the operation of bringing the temperatures of the central portion and side surface of the glass close to each other is preferably carried out by passing the glass in an environment at a temperature lower than the glass transition temperature by 100° C. (Tg −100° C.) or higher, more preferably, by passing the glass in an environment at a temperature lower than the glass transition temperature by 50° C. (Tg −50° C.) or higher, and still more preferably by passing the glass in an environment at the glass transition temperature.

When the temperature in the above environment is set at a temperature too low, and when the operation of bringing the temperatures of the central portion and side surface of the glass close to each other is carried out in a furnace, it is required to lengthen and enlarge the furnace. Further, when the operation of bringing the temperatures of the central portion and side surface of the glass close to each other is carried out in the mold, it is required to lengthen and enlarge the mold. As a result, a large space may be required, or it may be difficult to control the speed of withdrawing the glass from the outlet of the through hole.

When the glass shaped material is cut apart, a glass having too low a temperature is difficult to split apart since the Young's modulus thereof increases. In this invention, the glass is a continuous material continued from a molten glass to a glass shaped material. When the glass shaped material is split apart with a big forcer the impact thereof may be exerted on the molten glass inside the mold to cause failures in obtaining a high-quality glass such as the disruption of flow of the glass, and the like. The glass can be cut apart with a wire saw or a grinder. Undesirably, however, it is required to cool the glass to a temperature around room temperature, and this cooling requires a space that is some tens meters long for gradual cooling. For carrying the excellent splitting of the glass shaped material apart, the splitting is carried out preferably at a glass temperature around the glass transition temperature or lower, more preferably, at a glass temperature lower than the glass transition temperature by a maximum of 150° C. but not higher than the glass transition temperature, still more preferably, at a glass temperature lower than the glass transition temperature by a maximum of 100° C. but not higher than the glass transition temperature, yet more preferably, at a glass temperature lower than the glass transition temperature by a maximum of 50° C. but not higher than the glass transition temperature, and particularly preferably, at a glass temperature around the glass transition temperature. In this invention, the operation of bringing the temperatures of the central portion and side surface of the glass close to each other is carried out in an environment at (Tg −150° C.) or higher by taking account of the above point. After the operation of bringing the temperatures of the central portion and side surface of the glass close to each other is carried out, that is, after a strain is reduced, the glass shaped material is split apart or cut apart, whereby the glass shaped material can be separated in a desired position without breaking it.

The upper limit of the temperature for carrying out the operation of bringing the temperatures of the central portion and side surface of the glass close to each other can be set at a temperature at which the outer form (cross sectional form perpendicular to the withdrawing direction) of a glass shaped by rapidly cooling the side surface of the glass is not deformed. It can be set preferably at a softening temperature or lower, more preferably, at a temperature lower than the softening temperature.

When the above operation is carried out in an atmosphere, there can be employed a constitution in which a furnace called a shaping furnace is connected to the outlet of the through hole, the glass continuously withdrawn from the outlet of the through hole moves on into the furnace and when the glass has a state where the temperatures of the central portion and the side surface are close to each other, it goes out of the furnace. Further, the time period for which it passes through the furnace can be set for a time period for which the internal stress in the glass shaped material can be decreased to such an extent that no explosive destruction takes place or to such an extent that the glass is not broken by a slight thermal shock or mechanical impact. For this purpose, the length of the shaping furnace along the glass-withdrawing direction can be determined as required, experimentally, etc., by taking account of the speed of withdrawing the glass and the time period of the glass passing inside the furnace. The temperature of the atmosphere in the furnace can be controlled, for example, by controlling the value of electric current that flows in a heater arranged in the furnace or the time period for which electric current is caused to flow.

By conducting the operation of bringing the temperatures of the central portion and side surface of the glass close to each other, the temperature difference between the central portion and side surface of the glass can be adjusted, for example, to 0 to 150° C., preferably, to 0 to 100° C., more preferably, to 0 to 50° C. The above operation of bringing the temperatures of the central portion and side surface of the glass close to each other ends in a state where the temperature of the glass is considerably higher than room temperature, differing from the annealing that is the operation of gradually cooling the glass to a temperature around room temperature.

The mold to be used will be explained below.

In the mold, preferably, the ratio of the inner diameter of the through hole to the length thereof (inner diameter/length) is adjusted to the range of from 1/50 to 3, from the viewpoint of prevention of the fusion-induced adherence, spreading and bending of the glass. It is more preferably in the range of from 1/20 to 2. The inner diameter of the through hole is to be determined by taking account of the outer diameter of the glass shaped material to be obtained, and for example, it can be 10 to 100 mm although the above inner diameter shall not be limited thereto.

In order to ensure that the movement of the glass inside the mold is not disturbed, desirably, the cross-sectional form that the mold has perpendicular to the moving direction of the glass at any portion where the glass moves is made equal to the cross-sectional form that the glass shaped material has perpendicular to its moving direction. When the temperature distribution of the mold is not controlled, the temperature on the inlet side of the mold is higher than the temperature on the outlet side during shaping. Therefore, when the through hole is formed so that it has a constant inner diameter at room temperature, the inner diameter of the through hole is no longer constant along the moving direction of the glass during shaping due to the thermal expansion of the mold. In this method, preferably, the inner diameter of the through is increased from the inlet to the outlet so that the above inner diameter is constant along the moving direction of the glass during shaping, or the through hole is tapered and the gradient of the taper is determined by taking account of the thermal expansion so that the through hole is slightly expanded toward the outlet. In particular, when a glass having a low viscosity when it is caused to flow out is shaped, or when a mold formed of a material to which a glass has high wettability is used, desirably, the gradient of the taper is increased for preventing the glass from adhering to the mold by fusing.

The material for the mold is preferably carbon, a casting, a refractory metal such as nickel, or the like. The step of producing the glass shaped material from the molten glass is preferably carried out in an inert atmosphere from the viewpoint of the prevention of deterioration of the mold.

When the atmosphere has an influence on the quality of the glass shaped material, preferably, the atmosphere is controlled by surrounding the passage where the molten glass flows from the outlet of the pipe to the inlet of the through hole. In this method, the area of that surface of the glass at a high temperature which is exposed to the atmosphere is not so large as that in a conventional shaping method, and the object of controlling the atmosphere can be achieved by surrounding a necessary minimum narrow space as described above and replacing the internal atmosphere with a desired gas without the necessity of hermetically closing the forward end of the pipe and the entire shaping apparatus and replacing the atmosphere inside. For suppressing volatilization from a high-temperature glass surface and decreasing or preventing the wetting of the outer circumference of the forward end of the pipe backward by the glass so that the glass shaped material is improved in quality, it is preferred to employ a dry atmosphere, an inert gas atmosphere or a dry inert gas atmosphere as the above atmosphere.

This method is suitable as a method of decreasing or preventing striae when a glass shaped material formed of a glass containing a volatile component such as a boric acid component is produced by causing a glass that has moved past the cooling region to pass through an environment at a temperature lower than the glass transition temperature by a maximum of 150° C. regardless of whether or not the operation of bringing the temperatures of the central portion and side surface of the glass close to each other is employed.

In this embodiment, a more preferred embodiment is a method that uses a mold having a through hole having an inlet and an outlet which communicate with each other like a straight line. In this methods preferably, the mold is arranged such that the inlet is in a position higher than that of the outlet, and the molten glass is caused to flow into the inlet such that the height of a molten glass liquid surface in the through hole is constant.

FIG. 1 shows one example of the above preferred embodiment. As shown in FIG. 1, a molten glass 9 flowing down inside a pipe 1 is caused to flow into a mold 2, and in the process of the glass moving from a high position to a low position, the glass is shaped into a glass shaped material 11. When the portion through which the glass caused to flow in forms a through hole that connects the inlet and the outlet like a straight line as shown in FIG. 1, the molten glass more smoothly moves inside the mold and the flow thereof is not easily disturbed. As a result, there can be more stably produced an optically homogeneous glass shaped material.

In this method, preferably, the mold 2 is arranged such that the center axis of the through hole is vertical (such that it comes in agreement with a vertical line as shown in FIG. 1). However, the mold may be arranged such that the above center axis is inclined relative to the vertical line. When the mold 2 is arranged such that the center axis is vertical, the flow of the molten glass 9 flowing down vertically inside the pipe 1 moves inside the mold 2 toward the outlet direction without changing its moving direction as a whole, so that the disruption of the flow inside the mold is further decreased, and the striae-decreasing effect can be further improved.

When the molten glass 9 is caused to flow into the through hole that connects the inlet and the outlet with each other like a straight line, a straight glass shaped material can be obtained. The straight glass shaped material is advantageous for producing a press-molding glass material by working on the glass shaped material or producing an optical element. For obtaining a glass shaped material whose center axis is straight and in which cross-sectional forms perpendicular to the center axis and dimensions in any position are equal, desirably, not only the mold 2 having the through hole connecting the inlet and the outlet like a straight line is used, but also a glass withdrawn from the mold 2 is uniformly cooled. When the uniform cooling is carried out, the shrinkage of the glass can be made uniform, and the straightness of the glass shaped material can be maintained. Further, this invention also has an advantage that the glass shaped material is improved in straightness by carrying out the operation of bringing the temperatures of the central portion and side surface of the glass close to each other.

For stabilizing shaping conditions, preferably, the height of liquid surface of the molten glass 9 in the through hole is kept constant. For this purpose, it is sufficient to employ a constitution in which the outflow of the molten glass 9 from the pipe 1 is kept constant, and the speed of withdrawing the glass from the outlet is kept constant. Since, however, the outflow of the molten glass can vary slightly with the passage of time, it is desirable to control the speed of withdrawing the glass from the mold 2 such that the height of the above liquid surface is always constant.

The withdrawal of the glass from the outlet of the through hole will be explained below.

As a method for withdrawing the glass from the outlet of the through hole, there can be used any method of downward movement based on the weight of the glass itself, whereby drawing the glass out of the outlet of the through hole and taking the glass out by exerting a drawing force on the glass in addition to the gravitation working on the glass. Further, since the glass is hardly extended by the withdrawing, the speed of withdrawing the glass corresponds to the speed of movement of the above glass shaped material 11 withdrawn. The control of the withdrawing speed means that the force for drawing out the glass shaped material is controlled such that the withdrawing speed becomes a desired speed or that, when the glass moves downward at a speed higher than an intended speed, the speed of drawing out the glass shaped material is controlled such that it becomes an intended speed, by applying a force for reducing the speed of the glass shaped material.

When the speed of withdrawing the glass from the outlet of the through hole is too large or too small, the height of liquid surface of the molten glass 9 in the through hole is not constant, a gap is formed between the inner wall of the through hole and the glass, and the glass shaped material is no longer stabilized in dimensions. In an extreme case, the molten glass 9 overflows the mold 2 or the glass shaped material is defective in form. It is hence preferred to control the speed of the above withdrawal.

As one example of the control of the speed of withdrawing the glass shaped material, there can be employed a method in which that surface (side surface) 6 of the glass to be withdrawn from the outlet of the through hole which is formed by the inner wall of the through hole is held to control the speed of withdrawing the glass shaped material 11 from the outlet as shown in FIG. 1. For example, in a state that the side surface 6 of the glass shaped material 11 is held with a plurality of rollers 3 to prevent the rollers 3 and the side surface 6 of the glass shaped material from sliding on each other, the speed(s) of revolutions of the rollers 3 is/are controlled to control the speed of the glass shaped material moving downward. Desirably, a plurality of sets of the above plurality of rollers 3 are arranged along the moving passage of the glass shaped material, and the gravity working on the glass shaped material is separated and supported with a plurality of sets of the rollers. When the above manner is employed, it can more reliably prevent the glass shaped material 11 from sliding between the rollers 3 and making it impossible to control the withdrawing speed. It is desirable to arrange the above rollers 3 inside the above shaping furnace 7. The glass shaped material that has moved past the shaping furnace 7 has a strain decreased, and the glass shaped material positioned lower than the rollers 3 is in a suspension state in which it is held with the rollers 3. Therefore, when the glass shaped material that is positioned lower than the rollers 3 is separated from the glass in an upper position, no bad influence is exerted on the control of the withdrawing speed. Further, since the glass shaped material that comes out of the shaping furnace 7 has a strain decreased, the glass is not broken when the glass shaped material is separated. Further, when the glass shaped material annealed is cut apart or split apart in a position past the above holding position, advantageously, there is no need to discontinue the flowing of the molten glass into the mold. In this manner, the operation can be carried out without an excess increase in the weight of the glass shaped material to be held, so that it is advantageous for controlling the speed of withdrawing the glass, and while the glass shaped material is being shaped, the separated glass shaped material can be transferred to the net step, so that the productivity of glass shaped materials can be improved.

Figure 2:
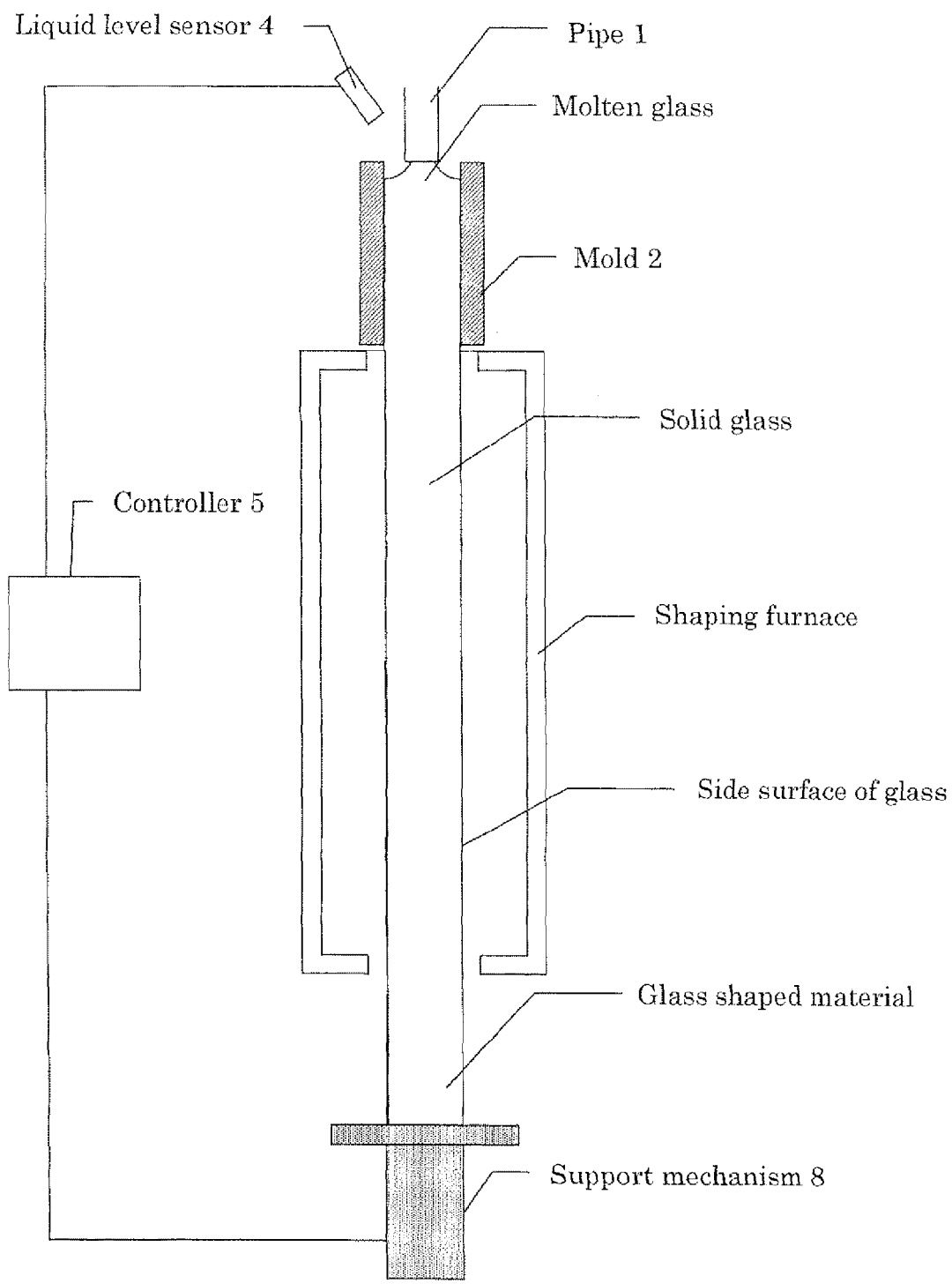
FIG. 2 is a drawing for explaining one example of a method for controlling the speed of withdrawing a glass from a through hole.

On the other hand, in the method of controlling the withdrawing speed by holding the glass side surface, a force of a predetermined value or larger for holding the glass cannot be applied since the glass is broken when the force is too large. When the weight of the glass shaped material becomes large, therefore, the glass shaped material slides between the rollers, and it is difficult to control the withdrawing speed. For avoiding such a situation, it is sufficient to employ a method of supporting the forward end of the glass withdrawn from the outlet of the through hole thereby to control the speed of withdrawing the glass from the through hole. One example thereof is shown in FIG. 2. This method is suitable for shaping a glass shaped material having a large weight since it is different from the method of holding the side surface or the glass shaped material is not held with a frictional force.

In any one of the above methods of controlling the withdrawing speed, the withdrawing speed can be controlled by monitoring the height of liquid surface of the molten glass 9 in the mold 2 with a liquid surface sensor 4 and increasing the withdrawing speed when the height of the liquid surface is higher than a reference height according to a signal of the above monitor or decreasing the withdrawing speed when it is lower than the reference height. For example, the above monitor signal is inputted into a speed controller 5, the controller 5 compares the reference height with the monitored liquid surface height, and the result is fed back to the withdrawing speed. In the method of controlling the withdrawing speed by holding the glass side surface with the rollers 3 (see FIG. 1), a control signal outputted from the controller 5 is inputted to a controller for a motor in rotation, to control the rotation speed of the rollers 3. In the method of controlling the withdrawing speed by supporting the forward end of the glass withdrawn from the outlet of the through hole (see FIG. 2), a control signal outputted from the controller 5 is inputted to an actuator of a mechanism (support mechanism 8) for supporting the forward end, whereby the member that supports the forward end can be controlled such that its moving speed becomes a desired speed. The method for monitoring the height of liquid surface of the molten glass in the mold is not specially limited, and it includes a method using a thermometer, a laser sensor, etc.

Meanwhile, as the angle formed by the center axis of the through hole and the vertical line is increased, the frictional force between the through hole of the mold and the side surface of the glass shaped material increases. When the glass shaped material has a large weight, the withdrawing speed can be controlled even by the method of holding the side surface of the glass shaped material. Therefore, when a glass shaped material having a large weight is shaped from a glass having no extremely low viscosity when the glass is caused to flow out, the mold can be also arranged such that the center axis of the through hole is inclined with regard to the vertical line.

The method for separating the glass shaped material which is being withdrawn will be explained below.

The glass withdrawn from the outlet of the through hole has an internal stress that has been decreased by the operation of bringing the temperatures of the central portion and side surface of the glass close to each other, and the risk of explosive destruction or breaking thereof by a slight thermal shock or mechanical impact has been solved. Further, for cooling the glass to room temperature, it is required to withdraw the glass long from the mold. For this purpose, a large space is needed below the mold, or it may be difficult to perform the precise control of the withdrawing speed since the glass shaped material has an excess weight. It is hence desirable to cut the glass shaped material apart when the glass shaped material has a temperature in the vicinity of its glass transition temperature.

Figure 3:
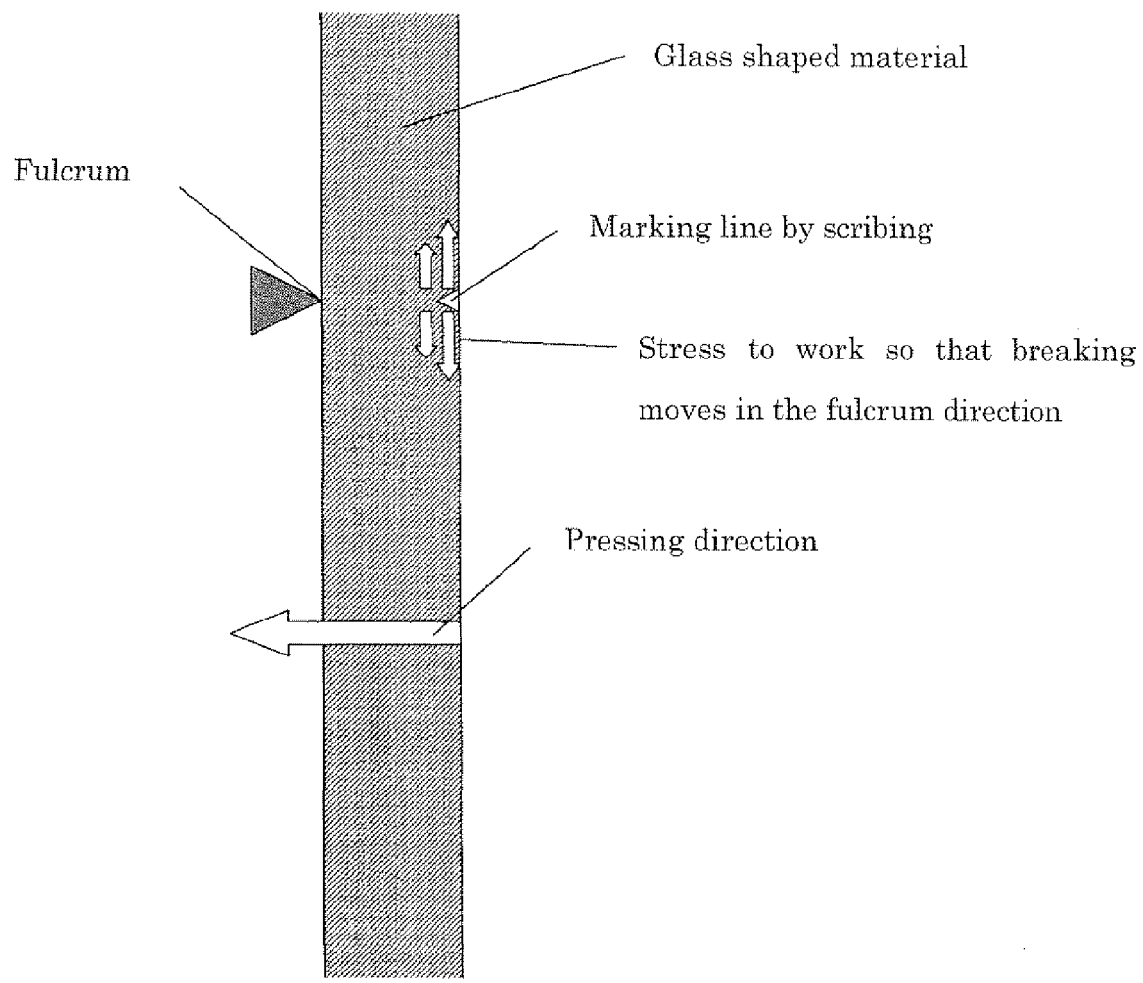
FIG. 3 is a drawing for explaining a specific example of a method for cutting apart a glass shaped material.
Figure 4:
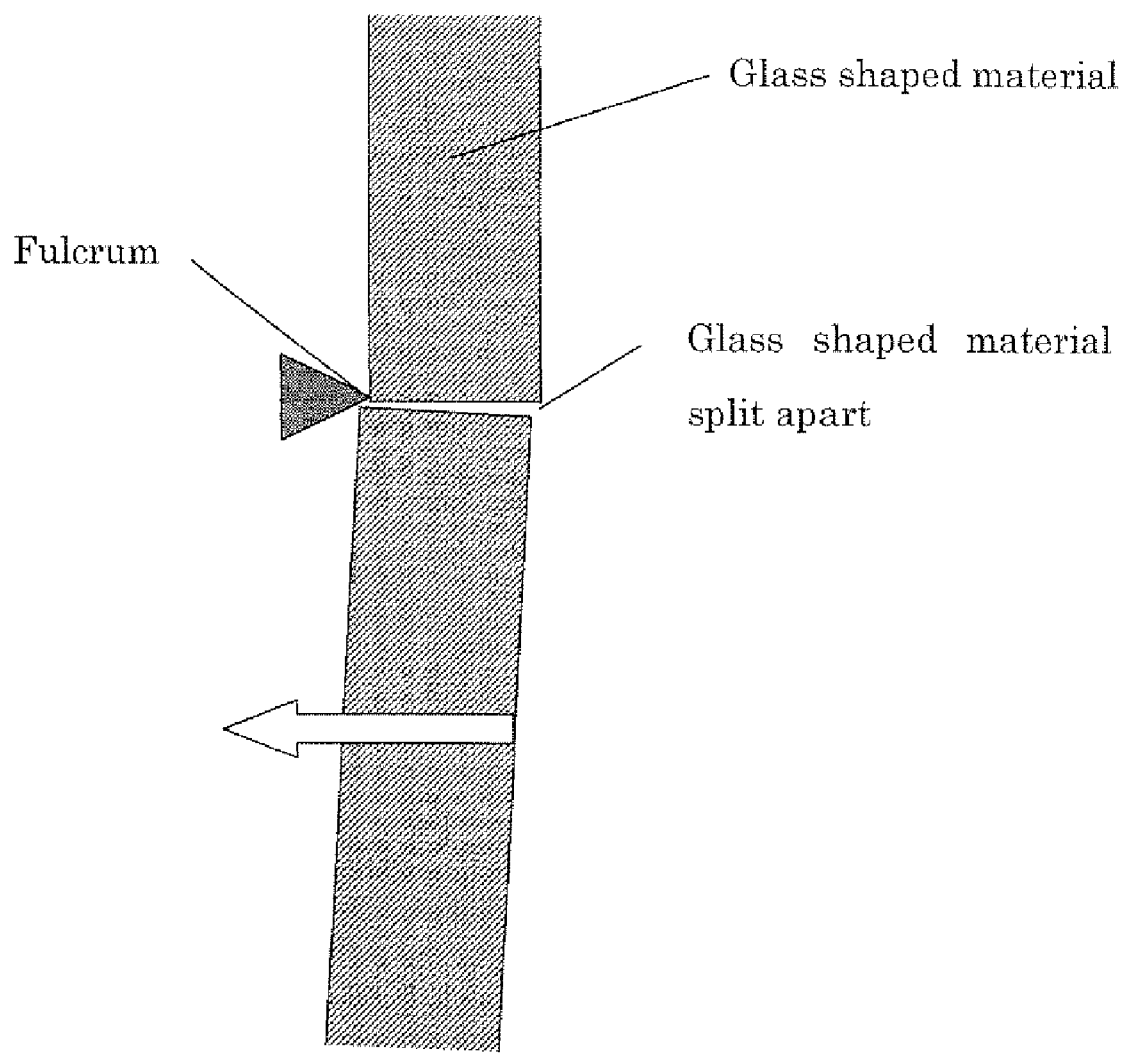
FIG. 4 is a drawing for explaining a specific example of a method for cutting apart a glass shaped material.
Figure 5:
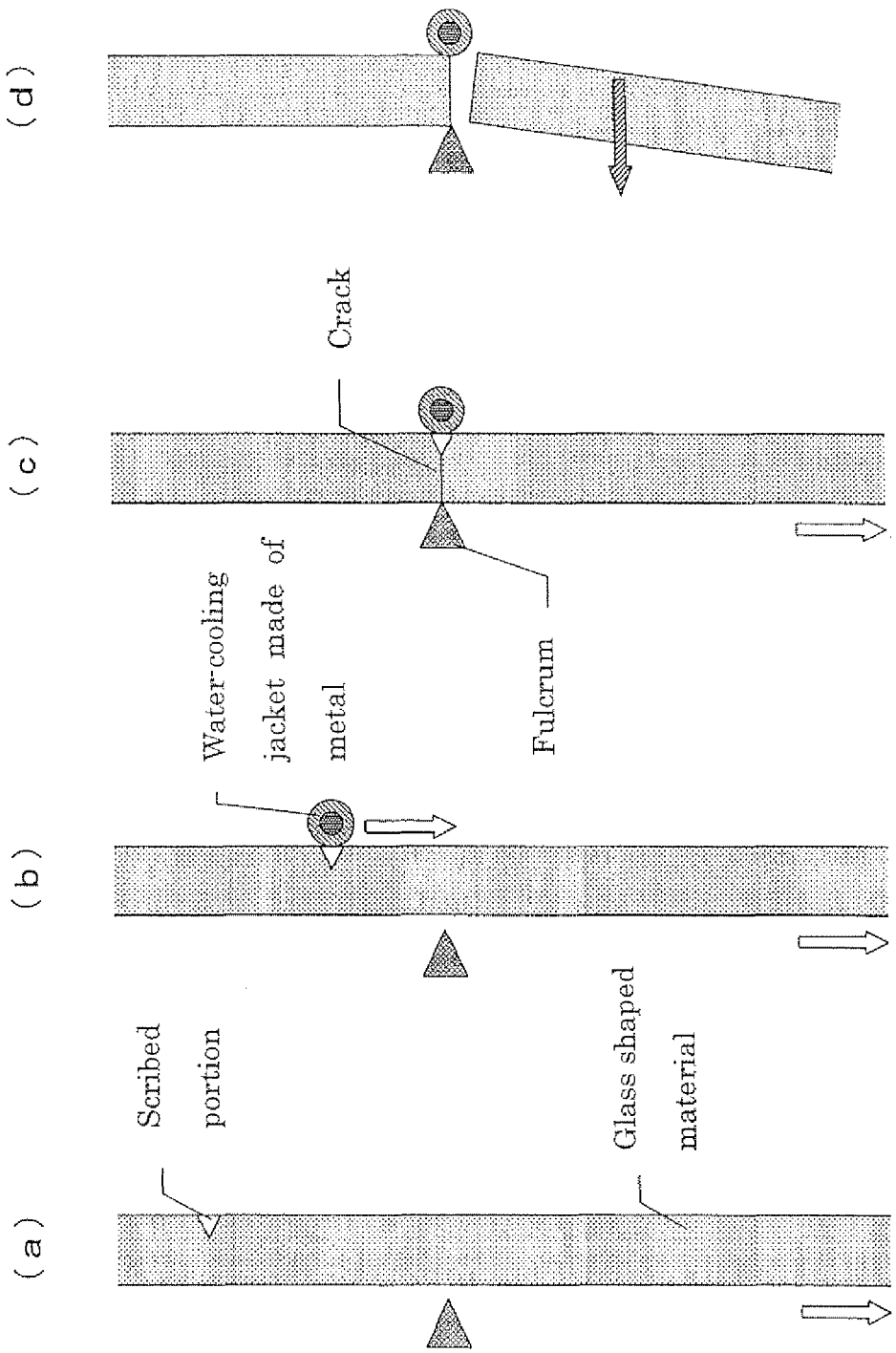
FIG. 5 is a drawing for explaining a specific example of a method for cutting apart a glass shaped material.
Figure 6:
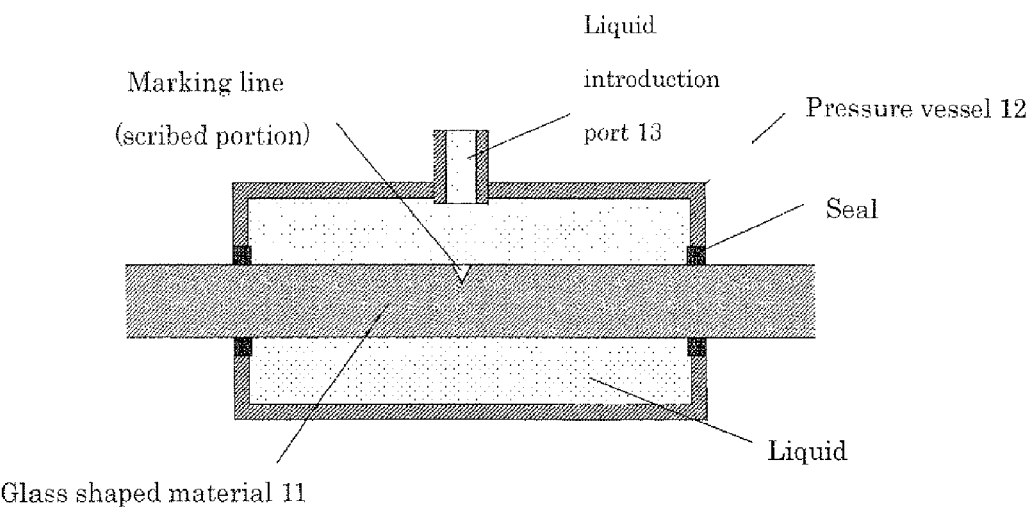
FIG. 6 is a drawing for explaining one example of a side pressure cutting method.
Figure 7:
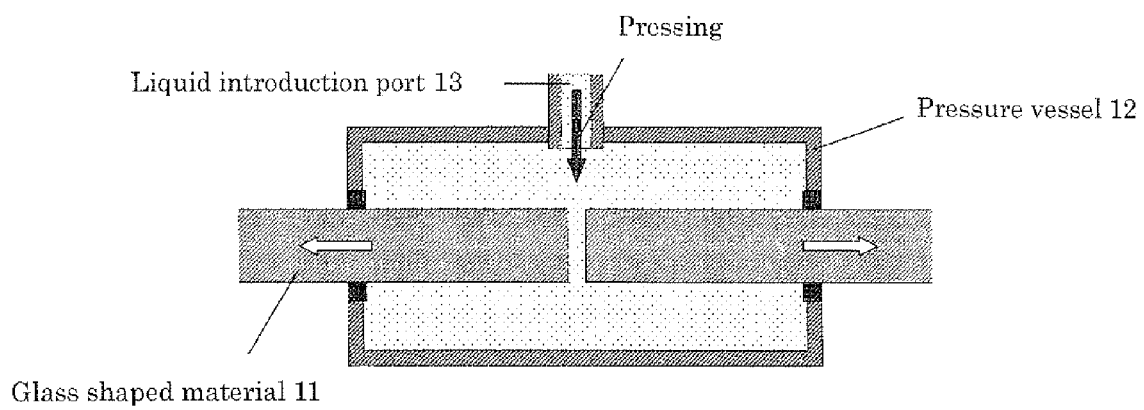
FIG. 7 is a drawing for explaining other example of a side pressure cutting method.

FIGS. 3 to 5 show specific embodiments of the method for cutting the glass shaped material apart. It is preferred to employ a method in which a marking line (ruling line) in the direction perpendicular to the glass shaped material withdrawing direction is formed on part of the side surface of the glass shaped material in a predetermined position by scribing as shown in FIG. 3, a fulcrum for locally supporting the glass shaped material is placed on that surface of the glass shaped material which is opposed to the above scribed position with regard to the center axis of the glass shaped material, and while the movement of that portion of the glass shaped material which is higher than the fulcrum is limited by the fulcrum, and a force in the horizontal direction is applied to that portion of the glass shaped material which is lower than the above scribed position, to split apart the glass shaped material in the scribed portion with the fulcrum being as a center as shown in FIG. 4.

When a glass shaped material having a larger outer diameter is split apart, preferably, as shown in FIG. 5, a jacket made of a metal having a water passage formed therein is locally contacted to a scribed portion of the glass shaped material to cause a crack, which leads from the marking line into the glass, by a thermal shock, a side surface opposed to the marking line with regard to the center axis of the glass shaped material is supported with a fulcrum and a force is applied to that portion of the glass shaped material which is below the marking line, whereby a torque is exerted such that the crack grows toward the portion supported by the fulcrum and the glass shaped material is split apart.

The size of the internal stress that occurs in the cooling step varies depending upon the form and size of the glass shaped material. For example, in a very narrow glass shaped material such as an optical fiber, the temperature difference between the inside and the surface thereof is not easily generated. Further, in a sheet glass having a very small thickness, the temperature difference between the inside and the surface thereof is not easily generated, either. On the other hand, in a rod-shaped glass having a large outer diameter or a thick sheet glass, the temperature difference between the inside and the surface thereof is large, and a large internal stress is liable to occur in the cooling step. Such a glass shaped material includes a sheet glass having a thickness of 3 mm or more or a rod-shaped glass having an outer diameter of 3 mm or more. This invention is therefore suitable for shaping a sheet glass having a thickness of 3 mm or more, more suitable for shaping a sheet glass having a thickness of 5 mm or more. Further, this invention is suitable for shaping a rod-shaped glass having an outer diameter of 3 mm or more, more suitable for shaping a rod-shaped glass having an outer diameter of 5 mm or more, still more suitable for shaping a rod-shaped glass having an outer diameter of 10 mm or more, yet more suitable for shaping a rod-shaped glass having an outer diameter of 10 mm or more.

In addition, the "rod-shaped glass" as used in the present specification refers to a glass shaped material having the cross-sectional form of a circle, an ellipse, a square, a rectangle in which the ratio of a major side length to a minor side length (major side length/minor side length) is 2 or less, or a polygon. Further, the "sheet glass" refers to a glass sheet in which the ratio of a width to a thickness (width/thickness) is over 2.

Further, the outer diameter of the rod-shaped glass means a length of a portion that is in a cross section perpendicular to the center axis of the rod-shaped glass and that is the smallest in the thickness of the glass. For example, in a glass having the form of a column, the cross section perpendicular to the center axis of the column forms a circle, so that the outer diameter thereof is the diameter of the above circle. In a glass having the form of an ellipsoidal column, the cross section perpendicular to the center axis forms an ellipse, so that the outer diameter thereof is the minor diameter of the above ellipse. In a glass having the form of a square pole, the cross section perpendicular to the center axis forms a regular squarer so that the outer diameter thereof is the length of one side. In a glass having the form of a rectangular pole in which the cross section perpendicular to the center axis forms a rectangle, the outer diameter corresponds to the length of miner side of the above rectangle.

The above-explained method is a method in which a molten glass flowing out of the pipe is caused to flow into the mold without any interruption, and when one mold is arranged below the outlet of the pipe from which the molten glass flows out, the glass shaped material can be continuously shaped.

An embodiment using a plurality of molds will be explained below.

In this invention, a plurality of the above molds are provided, and there can be repeatedly carried out the step of arranging one of the molds below the above pipe, causing a molten glass to continuously flow into the mold arranged below the pipe to shape a glass shaped material, discontinuing the flowing of the molten glass into the mold, carrying the mold with the molten glass therein away from the position below the above pipe and taking out the glass shaped material from the mold that has been carried away, and the step of carrying another mold different from the above mold with the molten glass therein, arranging it below the above pipe and causing a molten glass to flow into the mold that has been carried and arranged above.

The above method is suitable for shaping a glass shaped material having a large weight from a glass having a low viscosity when it is caused to flow out. This method requires a plurality of molds, a mechanism for moving the molds to a position below the pipe one after another and a mechanism for discontinuing the flowing of the molten glass into the mold. However, it has an advantage that it is free from the necessity of carrying out the operation of causing the molten glass to flow into the mold and the operation of taking the glass shaped material out of the same mold at the same time. Therefore, the flowing of the molten glass into the mold is discontinued when the length of the glass shaped material reaches a predetermined length, and the glass shaped material can be carried out from the position below the pipe together with the mold and taken out of the mold without cutting or splitting apart the glass shaped material. Therefore, the speed of withdrawing the glass shaped material can be controlled by supporting the forward end (lower end) of the glass shaped material, so that the speed of withdrawing a glass shaped material having a large weight can be highly accurately controlled unlike the method of holding the side surface of a glass shaped material by using a frictional force.

For discontinuing the above flowing of the molten glass into the mold, for example, a cutting blade composed of one blade suitable for cutting a molten glass flow having a low viscosity when it is caused to flow out is inserted between the outlet of the pipe and the inlet of the through hole, whereby the flowing of the molten glass flow can be cut apart. When the operation of carrying out the mold and carrying in another mold is completed, the flowing of the molten glass can be resumed by turning the cutting blade aside. In this method, preferably, the molten glass flowing out of the pipe is also caused to flow into the mold without interruption except for the above discontinuation of causing the molten glass into the mold.

The molds can be carried in and carried away, for example, by using two molds and alternately carrying the molds them in and away from a position below the outlet of the flow pipe or by placing three or more molds on a mechanism for carrying a plurality of molds synchronously such as a turn table and index-turning the above table in a manner that the molds are one after another stopped below the outlet of the flow pipe.

In any one of the method using one mold and the method using a plurality of the molds, preferably, the pipe is arranged vertically and the mold is arranged such that the center of the liquid surface of the molten glass in the mold is positioned vertically below the center of the outlet of the flow pipe. In this manner, the molten glass can be caused to uniformly flow inside the mold from the inlet side to the outlet side, which is advantageous for obtaining an optically homogeneous glass shaped material.

This production method of a glass shaped material is suitable for producing a glass shaped material formed of a glass whose viscosity at a liquidus temperature (to be referred to as "liquidus viscosity" hereinafter) is less than 100 dPa·s. For keeping the glass from being devitrified, it is required to cause a molten glass to flow out at a temperature higher than a devitrification temperature range and cool the glass rapidly. The devitrification temperature range of a glass is not always accurately in agreement with the liquidus temperature. As a standard, however, it can be considered that a temperature in the vicinity of the liquidus temperature is the lower limit of the temperature at which the glass flows out without devitrification. When a glass having a liquidus viscosity of less than 100 dPa·s is caused to flow out without devitrification, the viscosity when the glass is caused to flow out is required to be less than 100 dPa·s. Therefore, a glass having a low viscosity is to be caused to flow out, and it is effective to apply the above method.

When the heat of the glass is rapidly taken away by increasing the ratio of the contact area of the glass to the inner wall of the through hole, there is also produced an effect that the devitrification of the class is prevented.

When it is mainly intended to decrease or prevent the striae of the glass shaped material, it is effective to employ a constitution in which a mold having a through hole whose center axis is like a straight line (the inlet and the outlet communicate with each other Like a straight line) is used, the mold is arranged such that the center axis of the through hole of the mold is vertical, and the molten glass is caused to continuously flow in the inlet of the through hole to produce the glass shaped material. To the form and dimensions of the through hole of the mold and the material of the mold, the above conditions can be applied as they are. In the through hole, preferably, the entire circumference of the glass side surface is brought into contact with the inner wall of the through hole to take the heat of the glass away from the above side surface. In this embodiment, preferably, the pipe for causing the molten glass to flow out is also arranged vertically. In this manner, the flow of the glass in the pipe, the moving direction of the glass in the mold and the direction of the gravity working on the glass can be arranged in line. By this constitution, it is made possible to keep the glass surface and the inside thereof from being mixed with each other, and the effect on the decreasing and prevention of the striae can be improved. From the viewpoint of an improvement in the effect on the decreasing and prevention of the striae, preferably, the positional relationship of the pipe and the mold is arranged such that the center axis of the pip and the center axis of the through hole of the mold are in agreement with each other, and the molten glass is caused to flow in.

According to the above method, there can be obtained an optically homogeneous glass shaped material in a large volume, in which the striae are localized in a surface layer of the glass shaped material and it is free of the striae inside. The thus-obtained glass shaped material can be processed into a press-molding glass material or can be processed into an optical element, or an optical element blank or an optical element can be produced by heating the above press-molding glass material and press-molding it, or an optical element can be produced by processing the above optical element blank, as will be described later.

According to the above method, optically homogeneous glass shaped materials can be highly productively produced without breaking them.

The optical element of this invention and the method for producing this optical element will be explained below.
[Optical Element]

The optical element of this invention is an optical element formed of the above optical glass of this invention. The optical element of this invention has excellent properties that the above optical glass has. Examples of the optical element of this invention include various lenses such as a spherical lens, an aspherical lens, a microlens, etc., a prism, etc. In view of uses, it is suitable for an interchangeable lens of a single-lens reflex camera, a lens for a digital still camera, a lens for a digital video camera, a lens for a projector, and the like.

An optical thin film such as an anti-reflection film may be formed on the surface of any one of these optical elements as required.
[Method for the Production of Optical Element]

The method for the production of an optical element, provided by this invention, is an optical element production method comprising the step of heating a glass material formed of the above optical glass under heat and shaping it.

Another embodiment of the method for the optical element production method of this invention is a method fox the production of an optical element, which comprises the steps of producing a glass material formed of the glass shaped material produced by the above production method I or production method II of a glass shaped material, softening the above glass material under heat and shaping it.

In each of these production methods, the glass that is excellent in devitrification resistance during reheating is used as a glass materials and in spite of the high-refractivity low-dispersion glass, the devitrification of the glass during shaping by reheating can be prevented, and optical elements can be highly productively produced.

The shaping method in the step of softening the glass material under heat and shaping it includes, for example, a method in which softened glass material is press-molded with a press mold, and a method in which a plurality of rollers are used, and a glass material is pressed between the rollers that are rotating, to shape it into a rod-shaped glass shaped material.

The press-molding method can be further divided into two embodiments, and the first method is a method in which a glass material is softened under heat and introduced into a press mold to press it and a press-molded product is gradually cooled, then ground and polished to complete an optical element. In this method, a glass material having the form of an optical element plus a grinding margin and a polishing margin is press-molded. The steps starting with the softening under heat up to gradual cooling can be carried out in atmosphere. In this method, a glass material whose entire surface is roughened by barrel-polishing is used, and a powder mold release agent such as boron nitride is uniformly applied to the entire surface of the glass material. And, it is introduced into a heating furnace, softened under heat and introduced into a press mold. Then, it is pressed with an upper mold member and a lower mold member, the mold is opened to take out a press-molded product, and the press-molded product is placed in a gradually cooling furnace to decrease a strain and bring the refractive index of the glass accurately into agreement with an intended value. After the molded product is cooled to room temperature, it is ground and polished by methods known as grinding and polishing methods for producing an optical element formed of a glass, to complete an optical element. In this manner, various optical elements such as a spherical lens, a prism, etc., are produced. An optical multi-layered film such as an anti-reflection film, etc., may be formed on the surface of the optical element as required.

The second method is a method in which a glass material whose surface is completed to be smooth is heated and precision press-molded to produce an optical element. Precision press-molding is called optics molding, and it is a method in which a mold member having precisely processed molding surfaces is provided, a press mold into which the above mold member is highly precisely incorporated is used, the entire form of an optical element is formed by molding, and the form of the above molding surface is precisely transferred to a glass to form an optical-function surface. This method enables the highly accurate formation of a plurality of optical-function surfaces in positional accuracy. For example, there can be produced a lens in which the tilts of center axes of the optical function surfaces of both lens surfaces and the decentering of the above center axes are suppressed. In the second method, the optical-function surface, i.e., the optical element surface that refracts, diffracts, reflects or transmits light can be formed without machine processes such as grinding, polishing, etc., so that optical elements which take a labor and a cost by machine processes can be highly productively produced. The precision press-molding can be carried out according to a known method. For example, a film that improves mold releasability and works to improve the lubricity between the glass and the molding surface, such as a carbon film, is formed on the entire surface of a press-molding glass material, and the above glass material is heated in a non-oxidizing atmosphere, followed by precision press-molding in the same atmosphere. Then, the press mold is opened and a press-molded product is taken out and gradually cooled to give an optical element. The circumferential portion of optical-function surface of the thus-obtained optical element may be subjected to machine processing such as the centering and edging of a lens. According to the above method, optical elements such as aspherical lenses, spherical lenses, lens arrays, microlenses, diffraction gratings, prisms, etc., can be highly productively produced. An optical multi-layered film such as an anti-reflection film or the like may be formed on the surface of the optical element as required.

The optical element of this invention can be produced by the above production method, while it can be also produced as follows. The above glass shaped material is precisely annealed to bring its refractive index into agreement with an intended value and decrease a strain in the glass, and the glass shaped material is cut or split apart to prepare a cut piece. The form of the glass shaped material includes, for example, the above rod-shaped glass. When the rod-shaped glass is cut apart perpendicular to the center axis of the glass, it is preferred to apply a lateral pressure cutting method.

Then, the cut piece is ground to prepare an optical element blank having the form of an optical element plus a grinding margin, and the blank is polished to complete an optical element.

When a rod-shaped glass shaped material is used, preferably, the outer diameter of the rod shaped glass shaped material is arranged to be equal to the outer diameter of an optical element, or the rod-shaped glass shaped material is formed so as to have a form having the outer diameter of an optical element plus a grinding margin and a polishing margin.

In this manner, various optical elements such as lenses, prisms, filters, etc., can be highly productively produced. An optical multi-layered film such as an anti-reflection film, or the like may be formed on the surface of the optical element.

EXAMPLES

This invention will be explained more in detail below with reference to Examples.

Example 1

Raw materials such as oxides, hydroxides, carbonates, nitrates, etc., were selected as required and weighed so as to obtain compositions shown in Tables 1 and 3. In each Example, the thus-prepared raw materials were mixed and then melted in a platinum crucible. Glasses in Examples were melted at 1,300 to 1,450° C. The glasses were stirred and refined, and then each glass was cast on an iron plate to form blocks. Each glass block was placed in a furnace that had been heated to a temperature in the vicinity of its glass transition temperature, and the blocks were annealed to room temperature. Samples for various measurements were cut out from each of the this obtained glass blocks, and measured as follows.

A sample was measured for a refractive index nd and an Abbe's number vd according to Japan Optical Glass Industry Society Standard JOGIS-01.

A sample was also measured for a coloring degree according to Japan Optical Glass Industry Society Standard JOGIS-02. Table 1 shows coloring degrees as $\lambda 70$ and $\lambda 80$. The measurement of $\lambda 70$ is based on the above Standard. First, a 10 mm thick glass sample having optically polished surfaces in parallel with each other is prepared, measurement light having an intensity $I_{in}$ is caused to enter one of the above optically polished surfaces at right angles, and light coming out of the other optically polished surface is measured for an intensity $I_{out}$. A wavelength at which the external transmittance ($I_{out}/I_{in}$) in a visible light region becomes 70% was taken as $\lambda 70$. In a visible light region on the wavelength side longer than $\lambda 70$, the external transmittance is over 70%. When a 10 mm thick sample cannot be prepared, there can be employed a method in which a sample having a given thickness is measured for an external transmittance and the result is converted to calculate a $\lambda 70$. $\lambda 80$ refers to a wavelength at which the external transmittance is 80% after the same measurement as that in $\lambda 70$ is carried out. Any other point is the same as that in $\lambda 70$.

With regard to the glass transition temperature Tg, a columnar glass sample having a diameter of 5 mm and a length of 20 mm was prepared and measured with a thermo-mechanical analyzer TMA4000s supplied by BRUKER axs.

With regard to the crystallization peak temperature Tx, a glass was fully pulverized in a mortar to prepare a sample, and the sample was measured with a high temperature type differential scanning calorimeter "Thermo Plus 2/DSC8270" supplied by Rigaku Corporation.

Tables 2 and 4 show the results.

In the above manner, there could be obtained highs refractivity low-dispersion glasses of which the $Ta_2O_5$ contents were limited to less than 13 mass % and which were excellent in devitrification resistance during reheating and had a refractive index nd of 1.86 or more and an Abbe's number vd of 38 or more.

TABLE 1

| Ex. No. | Glass composition (mass %) | | | | | | | | | | | |
|---|---|---|---|---|---|---|---|---|---|---|---|---|
| | $SiO_2$ | $B_2O_3$ | $Li_2O$ | $Na_2O$ | $K_2O$ | MgO | CaO | BaO | SrO | ZnO | $La_2O_3$ | $Gd_2O_3$ |
| 1 | 6.87 | 11.08 | 0 | 0 | 0 | 0 | 0 | 0 | 0 | 4.82 | 42.87 | 9.85 |
| 2 | 6.93 | 11.17 | 0 | 0 | 0 | 0 | 0 | 0 | 3.05 | 4.86 | 43.24 | 9.93 |
| 3 | 6.83 | 11.01 | 0 | 0 | 0 | 0 | 0 | 4.45 | 0 | 4.79 | 42.62 | 9.79 |
| 4 | 7.03 | 11.33 | 0 | 0 | 0 | 0 | 1.67 | 0 | 0 | 4.93 | 43.86 | 10.07 |

TABLE 1-continued

| | | | | | | | | | | | | |
|---|---|---|---|---|---|---|---|---|---|---|---|---|
| 5 | 7.06 | 11.39 | 0 | 0 | 0 | 1.21 | 0 | 0 | 0 | 4.95 | 44.06 | 10.12 |
| 6 | 7.07 | 12.45 | 0 | 0 | 0 | 0 | 0 | 0 | 0 | 4.96 | 44.14 | 10.14 |
| 7 | 6.68 | 10.77 | 0 | 0 | 0 | 0 | 0 | 0 | 0 | 4.69 | 41.67 | 9.57 |
| 8 | 6.98 | 11.25 | 0 | 0 | 0 | 0 | 0 | 0 | 0 | 4.9 | 43.55 | 10 |
| 9 | 8.56 | 9.99 | 0 | 0 | 0 | 0 | 0 | 0 | 0 | 4.79 | 42.56 | 9.77 |
| 10 | 6.86 | 11.07 | 0 | 0 | 0 | 0 | 0.54 | 0 | 0 | 4.82 | 42.83 | 9.84 |
| 11 | 6.92 | 11.16 | 0 | 0 | 0 | 0 | 1.65 | 0 | 0 | 2.46 | 43.19 | 9.92 |
| 12 | 6.98 | 11.25 | 0 | 0 | 0 | 0 | 3.37 | 0 | 0 | 0 | 43.53 | 10 |
| 13 | 7 | 11.28 | 0 | 0 | 0 | 0 | 0 | 0 | 0 | 4.91 | 43.66 | 10.03 |

| Ex. No. | Glass composition (mass %) | | | | | | | | | |
|---|---|---|---|---|---|---|---|---|---|---|
| | $Y_2O_3$ | $Yb_2O_3$ | $Bi_2O_3$ | $ZrO_2$ | $TiO_2$ | $Nb_2O_5$ | $Ta_2O_5$ | $WO_3$ | $Sb_2O_3$✕ | Total |
| 1 | 3.9 | 0 | 0 | 5.33 | 0 | 5.42 | 9.86 | 0 | 0.2 | 100.2 |
| 2 | 3.93 | 0 | 0 | 5.38 | 0 | 1.55 | 9.95 | 0 | 0.2 | 100.2 |
| 3 | 3.87 | 0 | 0 | 5.3 | 0 | 1.53 | 9.8 | 0 | 0.2 | 100.2 |
| 4 | 3.99 | 0 | 0 | 5.46 | 0 | 1.57 | 10.09 | 0 | 0.2 | 100.2 |
| 5 | 4.01 | 0 | 0 | 5.48 | 0 | 1.58 | 10.14 | 0 | 0.2 | 100.2 |
| 6 | 4.01 | 0 | 0 | 5.49 | 0 | 1.58 | 10.15 | 0 | 0.2 | 100.2 |
| 7 | 3.79 | 0 | 0 | 5.18 | 0 | 1.5 | 9.59 | 6.57 | 0.2 | 100.2 |
| 8 | 3.96 | 0 | 0 | 5.42 | 2.37 | 1.56 | 10.02 | 0 | 0.2 | 100.2 |
| 9 | 3.87 | 0 | 0 | 5.29 | 0 | 5.38 | 9.79 | 0 | 0.2 | 100.2 |
| 10 | 3.89 | 0 | 0 | 5.33 | 0 | 2.83 | 12 | 0 | 0.2 | 100.2 |
| 11 | 3.93 | 0 | 0 | 5.37 | 0 | 5.46 | 9.94 | 0 | 0.2 | 100.2 |
| 12 | 3.96 | 0 | 0 | 5.41 | 0 | 5.5 | 10.01 | 0 | 0 | 100 |
| 13 | 3.97 | 0 | 0 | 6.65 | 0 | 6.83 | 5.67 | 0 | 0.2 | 100.2 |

✕The amount of $SB_2O_3$ is an amount based on the glass composition excluding the amount thereof.

TABLE 2

| | Total | | | | Physical property values | | | | | | |
|---|---|---|---|---|---|---|---|---|---|---|---|
| Ex. No. | $B_2O_3 + SiO_2$ (mass %) | content A (mass %) | Ratio A (mass ratio) | Ratio B (mass ratio) | Tx (°C.) | Tx − Tg (°C.) | Tg (°C.) | Ts (°C.) | nd | νd | λ80/λ70/λ5 (nm) |
| 1 | 17.95 | 67.37 | 0.15 | 3.15 | 861.1 | 160.2 | 700.9 | 748 | 1.88557 | 39.82 | λ80 489<br>λ70 387<br>λ5 489 |
| 2 | 18.10 | 64.04 | 0.16 | 3.15 | 838.8 | 133.6 | 705.2 | 757.5 | 1.86374 | 42.15 | λ80 443<br>λ70 370<br>λ5 312 |
| 3 | 17.84 | 63.11 | 0.16 | 3.15 | 839.5 | 133.4 | 706.1 | 750.9 | 1.8639 | 42.08 | λ80 446<br>λ70 373<br>λ5 313 |
| 4 | 18.36 | 64.95 | 0.16 | 3.15 | 843.6 | 143.4 | 700.2 | 751.9 | 1.86512 | 42.12 | —<br>λ70 386<br>λ5 314 |
| 5 | 18.45 | 65.25 | 0.16 | 3.15 | 848.7 | 146.5 | 702.2 | 753.2 | 1.86595 | 42.12 | —<br>λ70 395<br>λ5 325 |
| 6 | 19.52 | 65.36 | 0.16 | 2.99 | 840.5 | 145.3 | 695.2 | 740.4 | 1.86254 | 42.39 | —<br>λ70 377<br>λ5 315 |
| 7 | 17.45 | 68.28 | 0.14 | 3.15 | 847.2 | 151.1 | 696.1 | 743.6 | 1.88384 | 39.39 | λ80 565<br>λ70 412<br>λ5 354 |
| 8 | 18.23 | 64.49 | 0.16 | 3.15 | 845.8 | 146.3 | 699.5 | 750.5 | 1.88622 | 39.32 | —<br>λ70 415<br>λ5 347 |
| 9 | 18.55 | 66.87 | 0.15 | 3.03 | 884.9 | 181.1 | 703.8 | 756.3 | 1.88113 | 39.96 | λ80 513<br>λ70 388<br>λ5 330 |
| 10 | 17.93 | 64.71 | 0.19 | 3.15 | 855.6 | 154.2 | 701.4 | 752.2 | 1.87712 | 40.74 | λ80 521<br>λ70 385<br>λ5 323 |
| 11 | 18.08 | 67.87 | 0.15 | 3.15 | 867.2 | 158.5 | 708.7 | 757 | 1.881 | 40.14 | —<br>λ70 391<br>λ5 329 |
| 12 | 18.22 | 68.39 | 0.15 | 3.15 | 870.4 | 145.9 | 724.5 | 773.6 | 1.87603 | 40.46 | —<br>λ70 390<br>λ5 328 |
| 13 | 18.28 | 71.14 | 0.08 | 3.15 | 865.2 | 170.6 | 694.6 | 743.5 | 1.8821 | 40.3 | λ80 473<br>λ70 384<br>λ5 327 |

[Notes]
Total content A: Total content of $La_2O_3$, $Gd_2O_3$, $Y_2O_3$, $Yb_2O_3$, $ZrO_2$, $Nb_2O_5$ and $WO_3$.
Ratio A: $Ta_2O_5/(La_2O_3+Gd_2O_3+Y_2O_3+Yb_2O_3+ZrO_2+Nb_2O_5+WO_3)$
Ratio B: $(La_2O_3+Gd_2O_3+Y_2O_3+Yb_2O_3)/(B_2O_3+SiO_2)$

TABLE 3

| Ex. No. | $SiO_2$ | $B_2O_3$ | $Li_2O$ | $Na_2O$ | $K_2O$ | MgO | CaO | BaO | SrO | ZnO | $La_2O_3$ | $Gd_2O_3$ |
|---|---|---|---|---|---|---|---|---|---|---|---|---|
| 14 | 6.8 | 10.96 | 0 | 0 | 0 | 0 | 0 | 0 | 0 | 4.77 | 42.4 | 9.74 |
| 15 | 6.94 | 11.19 | 0 | 0 | 0 | 0 | 0 | 0 | 0 | 4.87 | 44.8 | 11.72 |
| 16 | 8.47 | 9.51 | 0 | 0 | 0 | 0 | 0 | 0 | 0 | 5.01 | 43.8 | 10.17 |
| 17 | 7.25 | 11.37 | 0 | 0 | 0 | 0 | 0 | 0 | 0 | 5.76 | 43.99 | 10.1 |
| 18 | 8.45 | 9.86 | 0 | 0 | 0 | 0 | 0 | 0 | 0 | 3.17 | 45.12 | 10.51 |
| 19 | 8.46 | 9.87 | 0 | 0 | 0 | 0 | 0 | 0 | 0 | 3.45 | 45.92 | 9.65 |
| 20 | 7.12 | 11.47 | 0.45 | 0 | 0 | 0 | 0 | 0 | 0 | 4.99 | 44.4 | 10.2 |
| 21 | 3.86 | 17.89 | 0 | 0 | 0 | 0 | 0 | 2.39 | 0 | 3.13 | 44.02 | 10.62 |
| 22 | 7.23 | 10.9 | 0 | 0 | 0 | 0 | 0 | 0 | 0 | 5.54 | 43.61 | 13.17 |
| 23 | 3.95 | 19.84 | 0 | 0 | 0 | 0 | 0 | 1.54 | 0 | 3.44 | 39.72 | 11.67 |
| 24 | 7.36 | 10.93 | 0 | 0 | 0 | 0 | 0 | 0 | 0 | 5.74 | 44.04 | 14.02 |
| 25 | 3.72 | 17.28 | 0 | 0 | 0 | 0 | 0 | 0 | 0 | 4.26 | 37.17 | 16.21 |

| Ex. No. | $Y_2O_3$ | $Yb_2O_3$ | $Bi_2O_3$ | $ZrO_2$ | $TiO_2$ | $Nb_2O_5$ | $Ta_2O_5$ | $WO_3$ | $Sb_2O_3$※ | Total |
|---|---|---|---|---|---|---|---|---|---|---|
| 14 | 3.85 | 0 | 0 | 6.46 | 0 | 2.29 | 12.73 | 0 | 0.2 | 100.2 |
| 15 | 3.94 | 0 | 0 | 5.46 | 0 | 5.47 | 5.62 | 0 | 0.2 | 100.0 |
| 16 | 3.83 | 0 | 0 | 6.41 | 0 | 3.41 | 9.39 | 0 | 0.2 | 100.2 |
| 17 | 4 | 0 | 0 | 6.7 | 0 | 5.12 | 5.71 | 0 | 0.2 | 100.2 |
| 18 | 3.82 | 0 | 0 | 6.4 | 0 | 4.04 | 8.61 | 0 | 0.2 | 100.2 |
| 19 | 3.28 | 0 | 0 | 6.4 | 0 | 4.04 | 8.93 | 0 | 0.2 | 100.2 |
| 20 | 4.04 | 0 | 0 | 5.52 | 0 | 1.59 | 10.21 | 0 | 0.2 | 100.2 |
| 21 | 2.14 | 0 | 0 | 6.24 | 6.04 | 3.67 | 0 | 0 | 0.2 | 100.2 |
| 22 | 3.96 | 0 | 0 | 6.94 | 0 | 5.59 | 3.04 | 0 | 0.2 | 100.2 |
| 23 | 2.35 | 0 | 0 | 6.37 | 2.99 | 8.12 | 0 | 0 | 0.2 | 100.2 |
| 24 | 4 | 0 | 0 | 7.35 | 0 | 6.56 | 0 | 0 | 0.2 | 100.2 |
| 25 | 2.07 | 0 | 0 | 6.02 | 0 | 13.26 | 0 | 0 | 0.2 | 100.2 |

※The amount of $Sb_2O_3$ is an amount based on the glass composition excluding the amount thereof.

TABLE 4

| Ex. No. | Total $B_2O_3 + SiO_2$ (mass %) | content A (mass %) | Ratio A (mass ratio) | Ratio B (mass ratio) | Tx (°C.) | Tx − Tg (°C.) | Tg (°C.) | Ts (°C.) | nd | νd | λ80/λ70/λ5 (nm) | |
|---|---|---|---|---|---|---|---|---|---|---|---|---|
| 14 | 17.75 | 64.75 | 0.20 | 3.15 | 902.3 | 200.8 | 701.5 | 756 | 1.88217 | 40.71 | — | |
|  |  |  |  |  |  |  |  |  |  |  | λ70 | 389 |
|  |  |  |  |  |  |  |  |  |  |  | λ5 | 320 |
| 15 | 18.13 | 71.39 | 0.08 | 3.34 | 871.1 | 170.5 | 700.6 | 751.9 | 1.88187 | 40.66 | — | |
|  |  |  |  |  |  |  |  |  |  |  | λ70 | 388 |
|  |  |  |  |  |  |  |  |  |  |  | λ5 | 327 |
| 16 | 17.98 | 67.63 | 0.14 | 3.21 | 881.7 | 167.3 | 714.4 | 766.2 | 1.88175 | 40.71 | — | |
|  |  |  |  |  |  |  |  |  |  |  | λ70 | 397 |
|  |  |  |  |  |  |  |  |  |  |  | λ5 | 323 |
| 17 | 18.62 | 69.92 | 0.08 | 3.12 | 852.5 | 148.1 | 704.4 | 757.8 | 1.8822 | 40.64 | — | |
|  |  |  |  |  |  |  |  |  |  |  | λ70 | 393 |
|  |  |  |  |  |  |  |  |  |  |  | λ5 | 325 |
| 18 | 18.31 | 69.90 | 0.12 | 3.25 | 893.1 | 182.5 | 710.6 | 758.9 | 1.88185 | 40.75 | — | |
|  |  |  |  |  |  |  |  |  |  |  | λ70 | 389 |
|  |  |  |  |  |  |  |  |  |  |  | λ5 | 325 |
| 19 | 18.32 | 69.30 | 0.13 | 3.21 | 867.7 | 149.4 | 718.3 | 769 | 1.88197 | 40.66 | — | |
|  |  |  |  |  |  |  |  |  |  |  | λ70 | 411 |
|  |  |  |  |  |  |  |  |  |  |  | λ5 | 326 |
| 20 | 18.59 | 65.75 | 0.16 | 3.15 | 824.5 | 149.6 | 674.9 | 727.8 | 1.86683 | 41.98 | λ80 | 444 |
|  |  |  |  |  |  |  |  |  |  |  | λ70 | 369 |
|  |  |  |  |  |  |  |  |  |  |  | λ5 | 313 |
| 21 | 21.75 | 66.69 | 0.00 | 2.61 | 820 | 130 | 690 | 740 | 1.875 | 38.55 | — | |
|  |  |  |  |  |  |  |  |  |  |  | λ70 | 433 |
|  |  |  |  |  |  |  |  |  |  |  | λ5 | 352 |
| 22 | 18.14 | 73.28 | 0.04 | 3.35 | 840.5 | 128.6 | 711.9 | 764.3 | 1.88256 | 40.8 | λ80 | 470 |
|  |  |  |  |  |  |  |  |  |  |  | λ70 | 390 |
|  |  |  |  |  |  |  |  |  |  |  | λ5 | 331 |

TABLE 4-continued

| Ex. No. | Total B$_2$O$_3$ + SiO$_2$ (mass %) | content A (mass %) | Ratio A (mass ratio) | Ratio B (mass ratio) | Tx (° C.) | Tx − Tg (° C.) | Tg (° C.) | Ts (° C.) | nd | νd | λ80/λ70/λ5 (nm) | |
|---|---|---|---|---|---|---|---|---|---|---|---|---|
| 23 | 23.79 | 68.23 | 0.00 | 2.26 | 814 | 134 | 680 | 730 | 1.86065 | 38.53 | — | |
|  |  |  |  |  |  |  |  |  |  |  | λ70 | 418 |
|  |  |  |  |  |  |  |  |  |  |  | λ5 | 348 |
| 24 | 18.29 | 75.97 | 0.00 | 3.39 | 825 | 110 | 715 | 768 | 1.88255 | 40.8 | λ80 | 457 |
|  |  |  |  |  |  |  |  |  |  |  | λ70 | 389 |
|  |  |  |  |  |  |  |  |  |  |  | λ5 | 330 |
| 25 | 21.01 | 74.73 | 0.00 | 2.64 | 820 | 135 | 685 | 73.5 | 1.88112 | 38.77 | — | |
|  |  |  |  |  |  |  |  |  |  |  | λ70 | 395 |
|  |  |  |  |  |  |  |  |  |  |  | λ5 | 332 |

[Notes]
Total content A, Ratio A and Ratio B are as defined in Notes to Table 2.

Example 2

Glass raw materials were weighed so as to give the same optical glasses as those produced in Example 1, and for each glass, they were fully mixed and then introduced into a melting vessel, followed by heating and melting. Then, they were fully refined and homogenized to obtain molten glasses, and each molten glass was respectively caused to continuously flow out from the outlet of a vertically arranged pipe at a constant flow speed and caused to flow into the center of the inlet of a through hole formed in a carbon mold arranged in a position shown in FIG. 1. The through hole of the mold had an inner diameter of φ20 mm and was arranged such that the center axis of the through hole was set in the vertical direction, and the center axis of the pipe and the center axis of the above through hole were arranged to be in agreement with each other. The through hole of the mold had a length of several hundreds millimeters, and a band heater that was not shown was wrapped around the mold to control the temperature of inner wall of the through hole as required. The side surface of the rod-shaped glass being taken out of the outlet of the through hole was held with two rollers to control the speed of withdrawing the rod-shaped glass. The height of liquid surface of the molten glass in the through hole of the mold was monitored with a laser sensor, a monitor signal outputted by the above sensor was inputted to a roller controller, and the electrical input to a motor for rotating the rollers was controlled such that the above liquid surface was at a constant level. In this Example, the speed of withdrawing the rod-shaped glass was controlled as follows. That is, a variation in the height of the above liquid surface was fed back to the speed of rotation of the rollers to maintain the height of the liquid surface at a constant level.

In the above manner, the rod-shaped glass of φ20 mm was continuously taken out of the outlet of the through hole. A shaping furnace was arranged right below the mold, and the rod-shaped glass taken out of the mold was immediately moved into the shaping furnace. A heater that is not shown was arranged in the shaping furnace, and the temperature of atmosphere in the furnace was maintained in a temperature range in which the rod-shaped glass was not broken. The above rollers were arranged in the shaping furnace. The rod-shaped glass took a time moving past the inside of the shaping furnace, and during the movement, the temperature of the center portion and the temperature of surface of the rod-shaped glass came near to each other. Therefore, no inner stress occurred which could explosively break the rod-shaped glass itself, and the rod-shaped glass was shaped without breaking the glass.

Then, a marking line was formed on part of the side surface of the rod-shaped glass, which had been taken out of the shaping furnace, in the direction perpendicular to the center axis of the rod-shaped glass by scribing. The portion where the marking line was formed was locally cooled by bringing a jacket made of a metal whose internal water passage had water running in contact with the marking line such that a crack extended toward the center from the marking line. In this case, the jacket made of a metal was caused to follow the movement of the rod-shaped glass, so that the state of its being in contact with the marking line was maintained. When the crack grew, that portion of the rod-shaped glass which was opposed to the above scribed position with regard to the center axis of the rod-shaped glass was supported with a fulcrum, and that side surface of the glass shaped material which was lower the marking line was pressed, to separate that portion of the rod-shaped glass which was lower than the marking line from that portion of the rod-shaped glass which was higher than the marking line. In addition, since the outer diameter of the rod-shaped glass in this Example was relatively as small as 20 mm, the rod-shaped glass could be also separated excellently without applying a thermal shock by the jacket made of a metal.

When the separation was carried out, the side surface of the rod-shaped glass to be separated was held with a robot arm, and while the separated rod-shaped glass was held with the above arm, it was transferred to the inlet of a continuation type gradually cooling furnace arranged next to the mold and shaping furnace. The continuation type gradually cooling furnace was provided with a heater and a conveyor for carrying the glass, and in the furnace whose temperature distribution was controlled, the rod-shaped glass placed on the belt was gradually cooled to remove a strain while it was moved.

The rod-shaped glass taken out of the continuation type gradually cooling furnace was cut, its cross-section was polished, and its inside was observed. In this case, striae were observed only in a layer very shallow from the surface, and no striae were found in any portion deeper than that. That is, most part of the rod-shaped glass was optically homogeneous.

Example 3

Press-molding glass materials were prepared as follows from those gradually cooled rod-shaped glasses prepared in Example 2. First, a marking line was formed on that portion of a rod-shaped glass side surface which was to be split apart? by a scribing. Then, the rod-shaped glass was inserted into a pressure vessel, and arranged such that the portion where the marking line had been formed was positioned in the center of the vessel. The rod-shaped glass was chucked at the opening portions of the vessel with rubber seals in a manner that the movement thereof in the center axis direction was not restricted, and by injecting water, the vessel was filled with water so as not to internally contain bubbles.

In this state, the water pressure in the vessel was increased to divide the rod-shaped glass perpendicular to the center axis thereof in the position of the marking line. In this manner, the rod-shaped glass was split apart at predetermined intervals to prepare cut pieces.

Then, the above cut pieces were barrel-polished to adjust them so that they had weights equal to the weights of the intended press-molded products, acute edges thereof were rounded, and they were surface-roughened to give press-molding glass materials.

Further, the above cut pieces were ground and polished to prepare precision press-molding glass materials having smooth surfaces.

Example 4

A powder mold release agent of boron nitride was uniformly applied to the entire surface of each of the press-molding glass materials prepared in Example 3, and the press-molding glass materials were placed in a heating furnace and softened under heat in atmosphere while they were transported in the furnace.

Each of the softened glass materials was respectively introduced into a press mold having an upper mold member, a lower mold member and a sleeve and press-molded in atmosphere, and the mold was opened to take out each of the thus-obtained press-molded products. Each of the products was placed in a gradually cooling furnace to carry out precision annealing, and they were cooled to room temperature and used as optical element blanks.

Then, the above blanks were ground and polished to produce spherical lenses of those optical glasses. Neither devitrification nor striae were observed inside the lenses, and optically homogeneous optical elements could be obtained.

Example 5

A carbon film was formed on the entire surface of each of the precision press-molding glass materials produced in Example 3, and each of the glass materials was heated in an atmosphere containing a gas mixture of nitrogen and hydrogen and precision press-molded with a press mold prepared by attaching a carbon film, as a mold release film, on the molding surface of a molding material made of SiC Then, the precision press-molded products were gradually cooled to give aspherical lenses formed of those optical glasses.

Neither devitrification nor striae were observed inside the lenses, and optically homogeneous optical elements could be obtained.

Example 6

The precision-annealed rod-shaped glasses obtained in Example 2 were split apart perpendicular to the center axis by a lateral pressure cutting method, to produce cut pieces. Then, the cut pieces were ground and polished to give spherical lenses formed of those optical glasses. Neither devitrification nor striae were observed inside the lenses, and optically homogeneous optical elements could be obtained.

Industrial Utility

The optical glass of this invention is a high-refractivity low-dispersion optical glass excellent in devitrification resistance, and when this optical glass is used, there can be provided a glass material to be molded by softening under heat and an optical element.

Further, an optical glass having the above properties can be obtained without using a large amount of expensive $Ta_2O_5$.

The invention claimed is:

1. An optical glass comprising, by mass %, 12 to 30% of total of $B_2O_3$ and $SiO_2$, 9 to 17% $B_2O_3$, 55 to 80% of total of $La_2O_3$, $Gd_2O_3$, $Y_2O_3$, $Yb_2O_3$, $ZrO_2$, $Nb_2O_5$ and $WO_3$, 2 to 10% of $ZrO_2$, 0 to 15% of $Nb_2O_5$, 0 to 12% of ZnO, 0% or more but less than 13% of $Ta_2O_5$, and 0 to 0.4% $Li_2O$, 0 to 5% BaO, wherein the ratio of the content of $Ta_2O_5$ to the total content of $La_2O_3$, $Gd_2O_3$, $Y_2O_3$, $Yb_2O_3$, $ZrO_2$, $Nb_2O_5$ and $WO_3$ is 0.23 or less, the ratio of the total content of $La_2O_3$, $Gd_2O_3$, $Y_2O_3$ and $Yb_2O_3$ to the total content of $B_2O_3$ and $SiO_2$ is from 2 to 4, the optical glass having a refractive index nd of 1.86 or more and an Abbe's number vd of 38 or more.

2. The optical glass as recited in claim 1, which contains 1 to 15% of $Nb_2O_5$.

3. The optical glass as recited in claim 1, which contains 0 to 15% of $WO_3$.

4. The optical glass as recited in claim 1, which contains 30 to 70% of total of $La_2O_3$, $Gd_2O_3$, $Y_2O_3$ and $Yb_2O_3$.

5. The optical glass as recited in claim 1, which contains 9 to 17% of $B_2O_3$, 1 to 14% of $SiO_2$, 30 to 60% of $La_2O_3$, 0 to 30% of $Gd_2O_3$, 0 to 10% of $Y_2O_3$, 0 to 5% of $Yb_2O_3$, 0 to 5% of BaO, 0 to 12% of $TiO_2$ and 0 to 1% of $Sb_2O_3$.

6. A rod-shaped glass shaped material formed of the optical glass recited in claim 1.

7. A method for the production of a glass shaped material which comprises casting into a mold a molten glass obtained by heating and melting a glass raw material to shape it into a glass shaped material formed of an optical glass,
wherein a mold having a through hole is used, the molten glass is caused to continuously flow into said through hole to shape it into the glass shaped material, the shaped glass is continuously withdrawn from the through hole, and the molten glass is cooled by brining the inner wall of the through hole into contact with the molten glass so that the inner wall surrounds the molten glass moving inside the through hole, to produce the glass shaped material formed of the optical glass recited in claim 1.

8. An optical element formed of the optical glass recited in claim 1.

9. A method for the production of an optical element, which comprises the step of softening a glass material formed of the optical glass recited in claim 1 and shaping it.

* * * * *